United States Patent
Goldfarbmuren et al.

(10) Patent No.: US 11,460,226 B2
(45) Date of Patent: Oct. 4, 2022

(54) FREEZE POINT SUPPRESSION CYCLE CONTROL SYSTEMS, DEVICES, AND METHODS

(71) Applicant: Rebound Technologies, Inc., Commerce City, CO (US)

(72) Inventors: Russell Goldfarbmuren, Denver, CO (US); Luke Erickson, Denver, CO (US); Josh Nelson, West Lafayette, IN (US)

(73) Assignee: Rebound Technologies, Inc., Commerce City, CO (US)

( * ) Notice: Subject to any disclaimer, the term of this patent is extended or adjusted under 35 U.S.C. 154(b) by 0 days.

(21) Appl. No.: 17/000,337

(22) Filed: Aug. 23, 2020

(65) Prior Publication Data

US 2021/0108831 A1 Apr. 15, 2021

Related U.S. Application Data

(63) Continuation of application No. PCT/US2019/019323, filed on Feb. 23, 2019.
(Continued)

(51) Int. Cl.
*F25B 17/10* (2006.01)
*B01D 3/14* (2006.01)

(52) U.S. Cl.
CPC ............... *F25B 17/10* (2013.01); *B01D 3/14* (2013.01)

(58) Field of Classification Search
CPC ........... F25B 17/10; B01D 3/14; G05D 21/02; B01F 1/0022; B01F 1/0038
(Continued)

(56) References Cited

U.S. PATENT DOCUMENTS

| 952,040 A | 3/1910 | Hall |
| 1,777,913 A | 10/1930 | Dahl |

(Continued)

FOREIGN PATENT DOCUMENTS

| CN | 105157140 | 12/2015 |
| JP | 58-501577 | 9/1983 |

(Continued)

OTHER PUBLICATIONS

Rebound Technologies, "Lab notebook: icepoint™ is ready to keep your ice cream cold," Jan. 20, 2015, https://www.rebound-tech.com/lab-notebook-icepoint-is-ready-to-keep-your-ice-cream-cold/ (last visited Jan. 26, 2021).

(Continued)

*Primary Examiner* — Steve S Tanenbaum
(74) *Attorney, Agent, or Firm* — Wilson Patent Law, LLC

(57) ABSTRACT

Methods, systems, and devices for freeze point suppression cycle control are provided in accordance with various embodiments. For example, some embodiments include a method of freeze point suppression cycle control. The method may include flowing a liquid to a first sensor; the liquid may include a mixture of a melted solid and a freeze point suppressant. The method may include determining an indicator value of a freeze point suppressant property of the liquid utilizing the first sensor. The method may include controlling a flow of the liquid to a separator utilizing a flow controller based on at least the determined indicator value of the freeze point suppressant property of the liquid; the separator may form a concentrated freeze point suppressant from the liquid. Freeze point suppression cycle control systems are also provided.

24 Claims, 17 Drawing Sheets

Related U.S. Application Data

(60) Provisional application No. 62/634,461, filed on Feb. 23, 2018.

(58) Field of Classification Search
USPC .................................................. 62/112
See application file for complete search history.

(56) References Cited

U.S. PATENT DOCUMENTS

| | | |
|---|---|---|
| 2,089,886 A | 8/1937 | Friedrich |
| 2,590,269 A | 3/1952 | Pike |
| 2,715,945 A | 8/1955 | Hankison |
| 3,146,606 A | 9/1964 | Grimes |
| 3,247,678 A | 4/1966 | Mohlman |
| 3,257,818 A | 6/1966 | Papapanu |
| 3,398,543 A | 8/1968 | Horton |
| 3,526,102 A | 9/1970 | Boylett |
| 3,747,333 A | 7/1973 | Gertsmann |
| 3,879,956 A | 4/1975 | Ganiaris |
| 4,471,630 A | 9/1984 | Sugimoto |
| 4,531,374 A | 7/1985 | Alefeld |
| 4,539,076 A | 9/1985 | Swain |
| 4,584,843 A | 4/1986 | Pronger |
| 4,809,513 A | 3/1989 | Goldstein |
| 4,822,391 A | 4/1989 | Rockenfeller |
| 4,907,415 A | 3/1990 | Stewart |
| 5,055,185 A | 10/1991 | McMurphy |
| 5,207,075 A | 5/1993 | Gundlach |
| 5,255,526 A | 10/1993 | Fischer |
| 5,632,148 A | 5/1997 | Bronicki |
| 5,678,626 A | 10/1997 | Gilles |
| 5,941,089 A | 8/1999 | Takaishi |
| 6,012,298 A * | 1/2000 | Goldstein ............... F25C 5/20 62/185 |
| 6,038,876 A | 3/2000 | Lang |
| 6,253,116 B1 | 6/2001 | Zhang |
| 6,432,566 B1 | 8/2002 | Condit |
| 7,201,215 B2 | 4/2007 | Ippoushi |
| 8,522,569 B2 | 9/2013 | Avery |
| 9,310,140 B2 | 4/2016 | Muren |
| 9,360,242 B2 | 6/2016 | Muren |
| 9,593,675 B2 | 3/2017 | Lin |
| 9,766,017 B2 | 9/2017 | Fujitsuka |
| 9,885,524 B2 | 2/2018 | Muren |
| 9,913,411 B2 | 3/2018 | De Bock |
| 10,584,904 B2 | 3/2020 | Goldfarbmuren |
| 10,995,993 B2 | 5/2021 | Muren |
| 11,079,184 B2 | 8/2021 | Goldfarbmuren |
| 11,255,585 B2 | 2/2022 | Saavedra |
| 2003/0066906 A1 | 4/2003 | Krause |
| 2005/0095476 A1 | 5/2005 | Schrooten |
| 2006/0141331 A1 | 6/2006 | Reiser |
| 2007/0062853 A1 | 3/2007 | Spani |
| 2007/0134526 A1 | 6/2007 | Numao |
| 2007/0137223 A1 | 6/2007 | Brekke |
| 2008/0083220 A1 | 4/2008 | Shichman |
| 2008/0142166 A1 | 6/2008 | Carson |
| 2009/0019861 A1 | 1/2009 | Heckt |
| 2009/0044935 A1 | 2/2009 | Nutsos |
| 2009/0293507 A1 | 12/2009 | Narayanamurthy |
| 2009/0312851 A1 | 12/2009 | Mishra |
| 2010/0145114 A1 | 6/2010 | Abhari |
| 2010/0206812 A1 | 8/2010 | Woods |
| 2010/0218542 A1 | 9/2010 | McCollough |
| 2010/0218917 A1 | 9/2010 | Barnwell |
| 2010/0270005 A1 | 10/2010 | Radhakrishnan |
| 2010/0281907 A1 | 11/2010 | Giertz |
| 2010/0310954 A1 | 12/2010 | Odgaard |
| 2011/0023505 A1 | 2/2011 | Popov |
| 2012/0011886 A1 | 1/2012 | Shifflett |
| 2012/0103005 A1 | 5/2012 | Kopko |
| 2012/0193067 A1 | 8/2012 | Miller |
| 2013/0199753 A1* | 8/2013 | Muren .................... H02S 40/38 165/80.1 |
| 2013/0227983 A1 | 9/2013 | Jeong |
| 2013/0327407 A1 | 12/2013 | Hermann |
| 2014/0102662 A1 | 4/2014 | Grama |
| 2014/0102672 A1 | 4/2014 | Campbell et al. |
| 2014/0338372 A1 | 11/2014 | Muren |
| 2015/0083374 A1 | 3/2015 | Clark |
| 2015/0114019 A1 | 4/2015 | Van Gysel |
| 2016/0187065 A1 | 6/2016 | Muren |
| 2016/0290735 A1 | 10/2016 | Muren |
| 2017/0191707 A1 | 7/2017 | Zhou |
| 2018/0252477 A1 | 9/2018 | Goldfarbmuren |
| 2018/0283745 A1 | 10/2018 | Goldfarbmuren |
| 2019/0137158 A1 | 5/2019 | Goldfarbmuren |
| 2020/0318867 A1 | 10/2020 | Goldfarbmuren |
| 2021/0389041 A1 | 12/2021 | Goldfarbmuren |

FOREIGN PATENT DOCUMENTS

| | | |
|---|---|---|
| JP | S62-500257 | 1/1987 |
| JP | 63-161333 | 7/1988 |
| JP | H-1252838 | 10/1989 |
| JP | H6-331225 | 11/1994 |
| JP | 07-055305 | 3/1995 |
| JP | H11-108298 | 4/1999 |
| JP | 11-190566 | 7/1999 |
| JP | 11-264681 | 9/1999 |
| JP | 2002-333170 | 11/2002 |
| JP | 2007-038147 | 2/2007 |
| JP | 2007-187407 | 7/2007 |
| JP | 2008-309360 | 12/2008 |
| JP | 2011-099640 | 5/2011 |
| JP | 2013-124820 | 6/2013 |
| JP | 2013-537474 | 10/2013 |
| JP | 2015-048987 | 3/2015 |
| JP | 2015-210033 | 11/2015 |
| KR | 10-1779368 | 9/2017 |
| WO | WO8301011 | 3/1983 |
| WO | WO8601881 | 3/1986 |
| WO | WO2009070728 | 6/2009 |
| WO | WO2011/162669 | 12/2011 |
| WO | WO2011163354 | 12/2011 |
| WO | WO2012036166 | 3/2012 |
| WO | WO2014100330 | 6/2014 |
| WO | WO2014111012 | 7/2014 |
| WO | WO2014191230 | 12/2014 |
| WO | WO2015196884 | 12/2015 |
| WO | WO2016049612 | 3/2016 |
| WO | WO2016081933 | 5/2016 |
| WO | WO2017165378 | 9/2017 |
| WO | WO2018183238 | 10/2018 |
| WO | WO2019/165328 | 8/2019 |
| WO | WO2020132467 | 6/2020 |

OTHER PUBLICATIONS

Extended European Search Report and Search Opinion, European Appl. No. 19757572.3, dated Nov. 8, 2021, EPO.
International Search Report and Written Opinion, Int'l Appl. No. PCT/US18/024436, dated Jun. 15, 2018, ISA—USPTO.
Extended European Search Report and Search Opinion, European Appl. No. 18777347.8, dated Nov. 18, 2020, EPO.
Office Action, Chinese Appl. No. 201880035102.3, dated Jul. 16, 2020, CNIPA.
Notice of Allowance, Chinese Appl. No. 201880035102.3, dated Feb. 2, 2021, CNIPA.
Notification of Reasons(s) for Refusal, Japanese Appl. No. JP2019-553031, dated Apr. 6, 2021, JPO.
Notification of Reasons(s) for Refusal, Japanese Appl. No. JP2019-553031, dated Oct. 19, 2021, JPO.
International Search Report and Written Opinion, Int'l Appl. No. PCT/US2015/052521, dated Dec. 14, 2015, ISA—USPTO.
Extended European Search Report and Search Opinion, European Appl. No. 15844161.8, dated Apr. 26, 2018, EPO.
First Examination Report, European Appl. No. 15844161.8, dated Mar. 13, 2019, EPO.
Intention to Grant, European Appl. No. 15844161.8, dated Sep. 30, 2019, EPO.

(56) References Cited

OTHER PUBLICATIONS

Office Action, Japanese Appl. No. JP 2016-576018, dated Aug. 6, 2019, JPO.
Decision to Grant a Patent, Japanese Appl. No. JP 2016-576018, dated Jun. 30, 2020, JPO.
International Search Report and Written Opinion, Int'l Appl. No. PCT/US17/023356, dated Jun. 16, 2017, ISA—USPTO.
Extended European Search Report and Search Opinion, European Appl. No. 17770960.7, dated Oct. 30, 2019, EPO.
Notification of Reasons(s) for Refusal, Japanese Appl. No. JP 2018-549561, dated Feb. 16, 2021, JPO.
International Search Report and Written Opinion, Int'l Appl. No. PCT/US2019/067892, dated Feb. 20, 2020, ISA—USPTO.
Non-Final Office Action, U.S. Appl. No. 13/761,463, dated Aug. 20, 2015, USPTO.
Notice of Allowance,, U.S. Appl. No. 13/761,463, dated Jan. 13, 2016, USPTO.
Notice of Allowance, U.S. Appl. No. 15/090,756, dated Aug. 21, 2017, USPTO.
Restriction Requirement, U.S. Appl. No. 15/855,048, dated Mar. 8, 2019, USPTO.
Non-Final Office Action, U.S. Appl. No. 15/855,048, dated Jun. 10, 2019, USPTO.
Final Office Action, U.S. Appl. No. 15/855,048, dated Feb. 27, 2020, USPTO.
Advisory Action, U.S. Appl. No. 15/855,048, dated Jun. 9, 2020, USPTO.
Notice of Panel Decision from Pre-Appeal Brief Review, U.S. Appl. No. 15/855,048, dated Oct. 5, 2020, USPTO.
Notice of Allowance, U.S. Appl. No. 14/280,080, dated Mar. 28, 2016, USPTO.
Restriction Requirement, U.S. Appl. No. 14/865,727, dated Jul. 27, 2017, USPTO.
Non-Final Office Action, U.S. Appl. No. 14/865,727, dated Dec. 1, 2017, USPTO.
Final Office Action, U.S. Appl. No. 14/865,727, dated Aug. 6, 2018, USPTO.
Advisory Action, U.S. Appl. No. 14/865,727, dated Oct. 24, 2018, USPTO.
Non-Final Office Action, U.S. Appl. No. 14/865,727, dated Mar. 18, 2019, USPTO.
Final Office Action, U.S. Appl. No. 14/865,727, dated Dec. 23, 2019, USPTO.
Notice of Panel Decision from Pre-Appeal Brief Review, U.S. Appl. No. 14/865,727, dated Nov. 6, 2020, USPTO.
Notice of Allowance, U.S. Appl. No. 14/865,727, dated Nov. 13, 2020, USPTO.
Notice of Allowance, U.S. Appl. No. 14/865,727, dated Feb. 23, 2021, USPTO.
Non-Final Office Action, U.S. Appl. No. 16/136,452, dated Apr. 22, 2020, USPTO.
Final Office Action, U.S. Appl. No. 16/136,452, dated Dec. 21, 2020, USPTO.
Restriction Requirement, U.S. Appl. No. 15/935,005, dated Jun. 20, 2019, USPTO.
Notice of Allowance, U.S. Appl. No. 15/935,005, dated Oct. 8, 2019, USPTO.
Notice of Allowance, U.S. Appl. No. 16/813,023, dated Oct. 27, 2020, USPTO.
Notice of Allowance, U.S. Appl. No. 16/813,023, dated Mar. 10, 2021, USPTO.
Non-Final Office Action, U.S. Appl. No. 16/813,023, dated Aug. 5, 2021, USPTO.
Nicholls, J., Thermal Approach to Grid Energy Storage, Oregon Future Energy Conference, Apr. 26, 2012, available at http://ns2.thesegurogroup.com/event/images/stories/PDFs/4b_nicholls.pdf.
Nishimura, S., Ultra Eco-Ice System, Feb. 3, 2014, available at http://www.atmo.org/media.presentation.php?id=371.
International Search Report and Written Opinion, Int'l Appl. No. PCT/2019/019323, dated Apr. 26, 2019, ISA—USPTO.
Notice of Allowance, U.S. Appl. No. 15/090,756, dated Oct. 25, 2017, USPTO.
Notice of Allowance, U.S. Appl. No. 15/855,048, dated Apr. 14, 2021, USPTO.
Notice of Allowance, U.S. Appl. No. 16/813,023, dated Dec. 9, 2020, USPTO.
Final Office Action, U.S. Appl. No. 16/813,023, dated Mar. 2, 2022, USPTO.
Certificate of Grant of Standard Patent by Pre-Registration, Hong Kong Appl No. 62021031785.0, Feb. 11, 2022, IPDHK.
Certificate of Grant of Standard Patent by Pre-Registration, Hong Kong Appl No. 62020010828.5, Jan. 7, 2022, IPDHK.
Office Action, Canadian Appl. No. 2952665, dated Jan. 11, 2022, CIPO.
Notification for Going through Patent Registration Formalities, Chinese Appl. No. 201980015025, dated Apr. 27, 2021, CNIPA.
Restriction Requirement, U.S. Appl. No. 17/352,326, dated Mar. 18, 2022, USPTO.
Notice of Allowance, U.S. Appl. No. 16/813,023, dated Jun. 9, 2022, USPTO.
Decision of Refusal, Japanese Appl. No. JP 2019-553031, dated Jun. 21, 2022, JPO.
Notification of Reason(s) for Refusal, Japanese Appl. No. 2020-544525, dated Jul. 5, 2022, JPO.
Non-Final Office Action, U.S. Appl. No. 17/352,326, dated Jul. 7, 2022, USPTO.

\* cited by examiner

630

640

650

660

FREEZE POINT SUPPRESSION CYCLE CONTROL SYSTEMS, DEVICES, AND METHODS

GOVERNMENT LICENSE RIGHTS

This invention was made with Government support under Contract 1533939 awarded by the National Science Foundation. The Government has certain rights in the invention.

BACKGROUND

Different tools and techniques may be utilized for refrigeration and/or heat pumping. There may be a need for new tools and techniques that may improve performance and/or efficiency.

SUMMARY

Methods, systems, and devices for freeze point suppression cycle control are provided in accordance with various embodiments. Some embodiments are applicable in the field of refrigeration and heat pumping. Some embodiments pertain to control of freeze point suppression cycles. Specifically, some embodiments focus on the control of a temperature at which a freeze point suppression cycle may be able to absorb heat.

For example, some embodiments include a method of freeze point suppression cycle control. The method may include flowing a liquid to a first sensor; the liquid may include a mixture of a melted solid and a freeze point suppressant. The method may include determining an indicator value of a freeze point suppressant property of the liquid utilizing the first sensor. The method may include controlling a flow of the liquid to a separator utilizing a flow controller based on at least the determined indicator value of the freeze point suppressant property of the liquid; the separator may form a concentrated freeze point suppressant from the liquid.

In some embodiments, the method may further include: determining a target property value of the concentrated freeze point suppressant based on the determined indicator value of the freeze point suppressant property of the liquid; determining an indicator value of a freeze point suppressant property of the concentrated freeze point suppressant utilizing a second sensor; and/or controlling further the flow of the liquid to the separator utilizing the flow controller based on at least the determined indicator value of the freeze point suppressant property of the concentrated freeze point suppressant and the determined target property value of the concentrated freeze point suppressant.

In some embodiments, determining the indicator value of the freeze point suppressant property of the liquid includes determining a temperature value of the liquid utilizing the first sensor and determining the indicator value of the freeze point suppressant property of the concentrated freeze point suppressant includes determining a temperature value of the concentrated freeze point suppressant utilizing the second sensor; the first sensor may include a temperature sensor and the second sensor may include a temperature sensor. In some embodiments, determining the indicator value of the freeze point suppressant property of the liquid includes determining a spectral signature of the liquid utilizing the first sensor and determining the indicator value of the freeze point suppressant property of the concentrated freeze point suppressant includes determining a refractive index of the concentrated freeze point suppressant utilizing the second sensor; the first sensor; the first sensor may include a spectrometer and the second sensor may include a refractometer. In some embodiments, determining the indicator value of the freeze point suppressant property of the liquid includes determining a temperature of the liquid utilizing the first sensor and determining the indicator value of the freeze point suppressant property of the concentrated freeze point suppressant includes determining a refractive index of the concentrated freeze point suppressant utilizing the second sensor; the first sensor may include a temperature sensor and the second sensor may include a refractometer.

Some embodiments include pumping the liquid from a tank to the first sensor; the liquid may be formed in the tank through combining the freeze point suppressant and a solid that forms the melted solid. Some embodiments include forming the concentrated freeze point suppressant from the liquid utilizing the separator. Some embodiments include combining the concentrated freeze point suppressant with a solid to form a portion of the liquid.

In some embodiments, the separator includes a distillation vessel. The separator may include at least a mechanical separator or a thermal separator.

In some embodiments, the indicator value of the freeze point suppressant property of the liquid includes at least a concentration value of the liquid, a density value of the liquid, a conductivity value of the liquid, a capacitance value of the liquid, a refractive index value of the liquid, a temperature value of the liquid, a pressure value of the liquid, a heat capacity value of the liquid, a freezing point value of the liquid, or a boiling point value of the liquid. In some embodiments, the target property value of the concentrated freeze point suppressant includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant. In some embodiments, the indicator value of the freeze point suppressant property of the concentrated freeze point suppressant includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant.

In some embodiments, forming the concentrated freeze point suppressant from the liquid utilizing the separator includes at least separating at least a portion of the freeze point suppressant from the liquid or separating at least a portion of the melted solid from the liquid. In some embodiments, the flow controller includes a variable-speed compressor that creates suction with respect to the distillation vessel. Some embodiments include flowing the concentrated freeze point suppressant through a control valve coupled with the controller that controls at least a flow of the concentrated freeze point suppressant from the distillation vessel or a flow of liquid from the distillation vessel to reform the melted solid.

Some embodiments include a freeze point suppression cycle control system. The system may include a first sensor positioned to determine an indicator value of a freeze point suppressant property of a liquid; the liquid may include a mixture of a melted solid and a freeze point suppressant. The system may include a flow controller that controls a flow of the liquid to a separator. The system may include a controller coupled with the first sensor and with the flow controller; the controller may control the flow of the liquid to the separator utilizing the flow controller based on at least the determined indicator value of the freeze point suppressant property of the liquid. Some embodiments of the system may include a second sensor positioned to determine an indicator value of a freeze point suppressant property of a concentrated freeze point suppressant; the second sensor may be coupled with the controller.

In some embodiments of the system, the first sensor includes a temperature sensor and the second sensor includes a temperature sensor. In some embodiments, the first sensor includes a spectrometer and the second sensor includes a refractometer. In some embodiments, the first sensor includes a temperature sensor and the second sensor includes a refractometer Some embodiments of the system include a pump that delivers the liquid to at least the first sensor or the flow controller. Some embodiments include the separator; the separator may form the concentrated freeze point suppressant from the liquid. The separator may include a distillation vessel. The separator may include at least a mechanical separator or a thermal separator. Some embodiments of the system include a mixing tank that combines the concentrated freeze point suppressant with a solid to form a portion of the liquid.

In some embodiments of the system, the controller utilizes the determined indicator value of the freeze point suppressant property of the liquid to determine a target property value of the concentrated freeze point suppressant. In some embodiments, the controller controls the flow of the liquid to the separator utilizing the flow controller based on at least the determined indicator value of the freeze point suppressant property of the concentrated freeze point suppressant or the determined target property value of the concentrated freeze point suppressant.

In some embodiments of the system, the separator forms the concentrated freeze point suppressant from the liquid through at least separating at least a portion of the freeze point suppressant from the liquid or separating at least a portion of the melted solid from the liquid. In some embodiments, the flow controller includes a variable-speed compressor that creates suction with respect the distillation vessel. The flow controller may further include a control valve coupled with the controller that controls at least a flow of the concentrated freeze point suppressant from the distillation vessel or a flow of liquid from the distillation vessel to reform the melted solid.

Some embodiments include methods, systems, and/or devices as described in the specification and/or shown in the figures.

The foregoing has outlined rather broadly the features and technical advantages of embodiments according to the disclosure in order that the detailed description that follows may be better understood. Additional features and advantages will be described hereinafter. The conception and specific embodiments disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of different embodiments may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
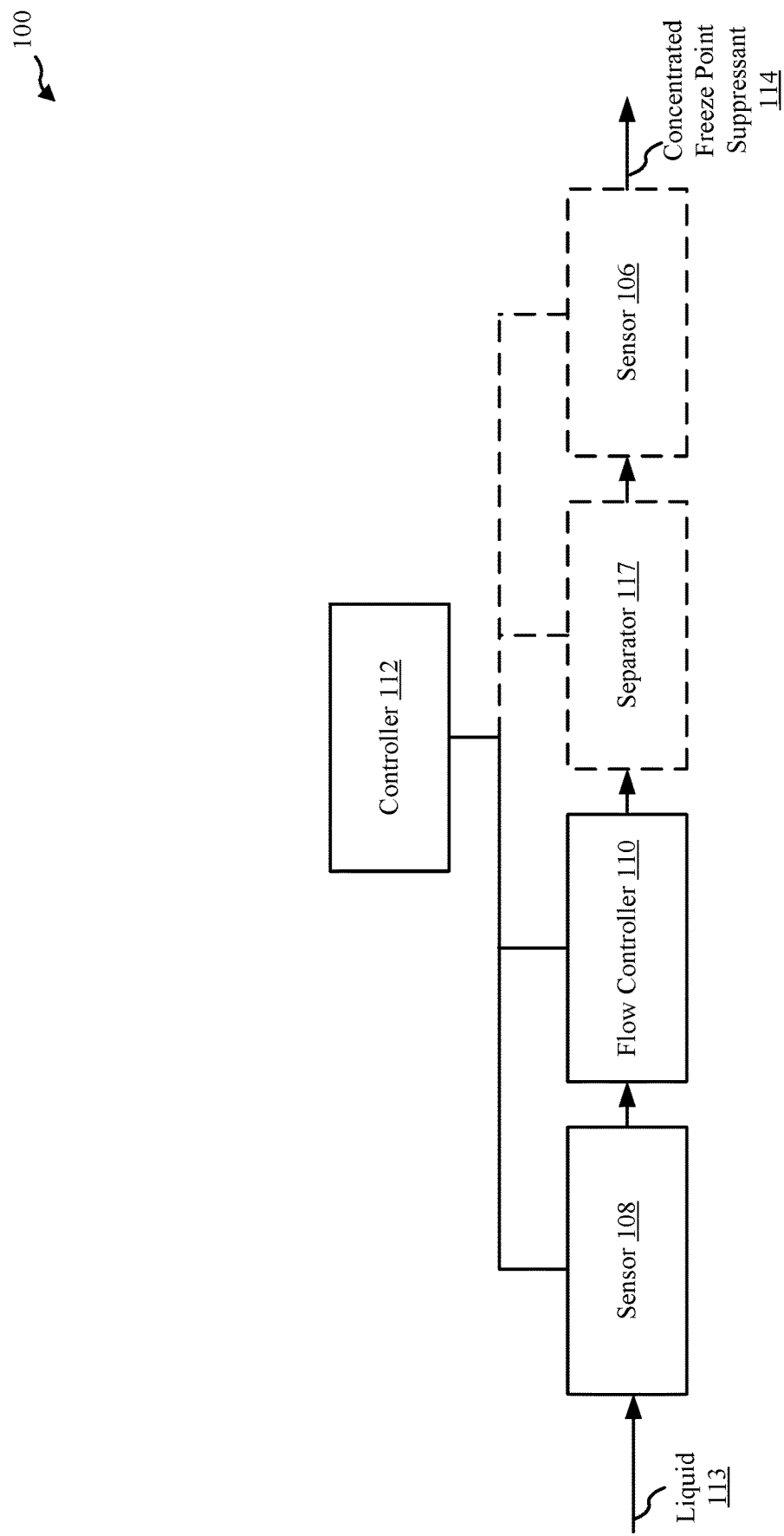
FIG. 1 shows a system in accordance with various embodiments.

This description provides embodiments, and is not intended to limit the scope, applicability, or configuration of the disclosure. Rather, the ensuing description will provide those skilled in the art with an enabling description for implementing embodiments of the disclosure. Various changes may be made in the function and arrangement of elements.

Thus, various embodiments may omit, substitute, or add various procedures or components as appropriate. For instance, it should be appreciated that the methods may be performed in an order different than that described, and that various stages may be added, omitted, or combined. Also, aspects and elements described with respect to certain embodiments may be combined in various other embodiments. It should also be appreciated that the following systems, devices, and methods may individually or collectively be components of a larger system, wherein other procedures may take precedence over or otherwise modify their application.

Methods, systems, and devices for freeze point suppression cycle control are provided in accordance with various embodiments. Some embodiments are applicable in the field of refrigeration and heat pumping. Some embodiments pertain to control of freeze point suppression cycles. Specifically, some embodiments focus on the control of a temperature at which a freeze point suppression cycle may be able to absorb heat.

Some embodiments provide for the control of a low temperature inside a freeze point suppression cycle. Some embodiments involve the integration of multiple components coupled with a controller that may that automatically control the cycle temperature via electrical signals and automatic control loops.

Some embodiments include a low concentration side sensor, a flow modulator, and a controller. Some embodiments may also include a high concentration side sensor and one or more pumps.

The controller, such as a processor, may receive one or more signals from one or more components and may send signals to the one or more components, which may maintain a useful temperature inside the freeze point suppression cycle's mixing tank, for example. This temperature's usefulness may be categorized namely by being below the melting point of the solid used in the freeze point suppression cycle. In some embodiments, the controller's goal may be to maintain a temperature as far below the pure freeze point of the solid used in the cycle as the user inputs; this may create useful refrigeration by the temperature difference between the pure freeze point and freeze point created by the mixture of the solid and the freeze point suppressant.

The physical process used by the controller may include modulating the flow through a separation system, which may concentrate a freeze point suppressant in order to maintain a concentration inside the mixing tank. To this end, the controller may capture the condition on the low concentration side of the cycle and the high concentration side in order to operate the separation system appropriately and maintain a low temperature, for example.

Turning now to FIG. 1, a system 100 is provided in accordance with various embodiments. System 100 may be referred to as a freeze point suppression cycle control system. The system 100 may include a first sensor 108 positioned to determine an indicator value of freeze point suppressant property of a liquid 113; the liquid 113 may include a mixture of a melted solid and a freeze point suppressant. The system 100 may include a flow controller 110 that may be utilized to control a flow of the liquid 113 to a separator 117. The system 100 may include a controller 112 coupled with the first sensor 108 and with the flow controller 110; the controller 112 may control the flow the liquid 113 to the separator 117 utilizing the flow controller 110 based on at least the determined indicator value of the freeze point suppressant property of the liquid 113. In some embodiments, the controller 112 may include one or more processors. The controller 112 may be coupled with the first sensor 108 and flow controller 110 such that it may receive and/or send signals in a variety of configurations, such as through a physical connection or a wireless connection. While the flow controller 110 may be shown such that is positioned between the sensor 108 and the separator 117, it may be positioned elsewhere in system 100, such as between separator 117 and sensor 106 or as part of separator 117, such as to control flows associated with separator 117.

Some embodiments of the system 100 include a second sensor 106 positioned to determine an indicator value of a freeze point suppressant property of a concentrated freeze point suppressant 114; the second sensor 106 may be coupled with the controller 112. In some embodiments, the first sensor 108 includes a temperature sensor and the second sensor 106 includes a temperature sensor. In some embodiments, the first sensor 108 includes a spectrometer and the second sensor 106 includes a refractometer. In some embodiments, the first sensor 108 includes a temperature sensor and the second sensor 106 includes a refractometer. Some embodiments may utilize sensors for the first sensor 108 and/or the second sensor 106 that may include combinations or permutations of sensors configured to determine or facilitate determining temperature, spectrum, refractive index, density, concentration, conductivity, capacitance, pressure, heat capacity, freezing point, and/or boiling point, for example.

Some embodiments of the system 100 include a pump configured to deliver the liquid 113 to at least the first sensor 108 or the flow controller 110. The liquid 113 may also be referred to as a dilute freeze point suppressant. Some embodiments include the separator 117 configured to form the concentrated freeze point suppressant 114 from the liquid 113. In some embodiments, the separator 117 includes at least a thermal separator or a mechanical separator. In some embodiments, the separator 117 includes a distillation vessel; for example, the separator 117 may include a distillation column. Some embodiments may utilize separators such as an opened kettle boiler, a recirculating plate boiler and separator, and/or a random-packed distillation column.

Separator 117 may utilize a wide variety of separation tools and techniques including, but not limited to: reverse osmosis, nano-filtration, photonic-driven precipitation, precipitation by chemical reaction, precipitation by solubility change, surfactant absorption, ion exchange, activated carbon absorption, flash separation, distillation, multi-effect distillation, vapor compression distillation, evaporation, membrane distillation, and/or gas permeable membrane separation. Some embodiments include a mixing tank configured to combine the concentrated freeze point suppressant 114 with a solid to form a portion of the liquid 113.

In some embodiments, the controller 112 is further configured to utilize the determined indicator value of freeze point suppressant property of the liquid 113 to determine a target property value of the concentrated freeze point suppressant 114. In some embodiments, the controller 112 is further configured to control the flow of the liquid 113 to the separator 117 utilizing the flow controller 110 based on at least the determined indicator value of the freeze point suppressant property of the concentrated freeze point suppressant 114 and/or the determined target property value of the concentrated freeze point suppressant 114.

In some embodiments of system 100, the indicator value of the freeze point suppressant property of the liquid 113 includes at least a concentration value of the liquid, a density value of the liquid, a conductivity value of the liquid, a capacitance value of the liquid, a refractive index value of the liquid, a temperature value of the liquid, a pressure value of the liquid, a heat capacity value of the liquid, a freezing point value of the liquid, or a boiling point value of the liquid. In some embodiments, the target property value of the concentrated freeze point suppressant 114 includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant. In some embodiments, the indicator value of the freeze point suppressant property of the concentrated freeze point suppressant 114 includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant. Some embodiments may utilize other indicators values with respect to these properties.

In general, the freeze point suppressant may include, but is not limited to, water, alcohol, ionic liquids, amines, ammonia, salt, non-salt soluble solids, organic liquid, inorganic liquid, triethylamine, cyclohexopuridine, mixtures of miscible materials, and/or a surfactant-stabilized mixture of immiscible materials. The melted solid may be formed from a solid that may include a fully or partially solid form of the following, but is not limited to, water, an organic material, an ionic liquid, an inorganic material, and/or DMSO.

One skilled in the art will recognize that this embodiment may represent a simple embodiment of the control architecture. The addition of multiple types of sensors, duplicate sensors, and/or duplicate methods of modulating the flow may result in better overall performance in accordance with various embodiments. Furthermore, the embodiments provided generally show how the control architecture may operate with different types of sensors and different types of separation equipment. Thus, the embodiments are not limited to a system with just one type of separation equipment or one type of sensor.

Figure 2A:
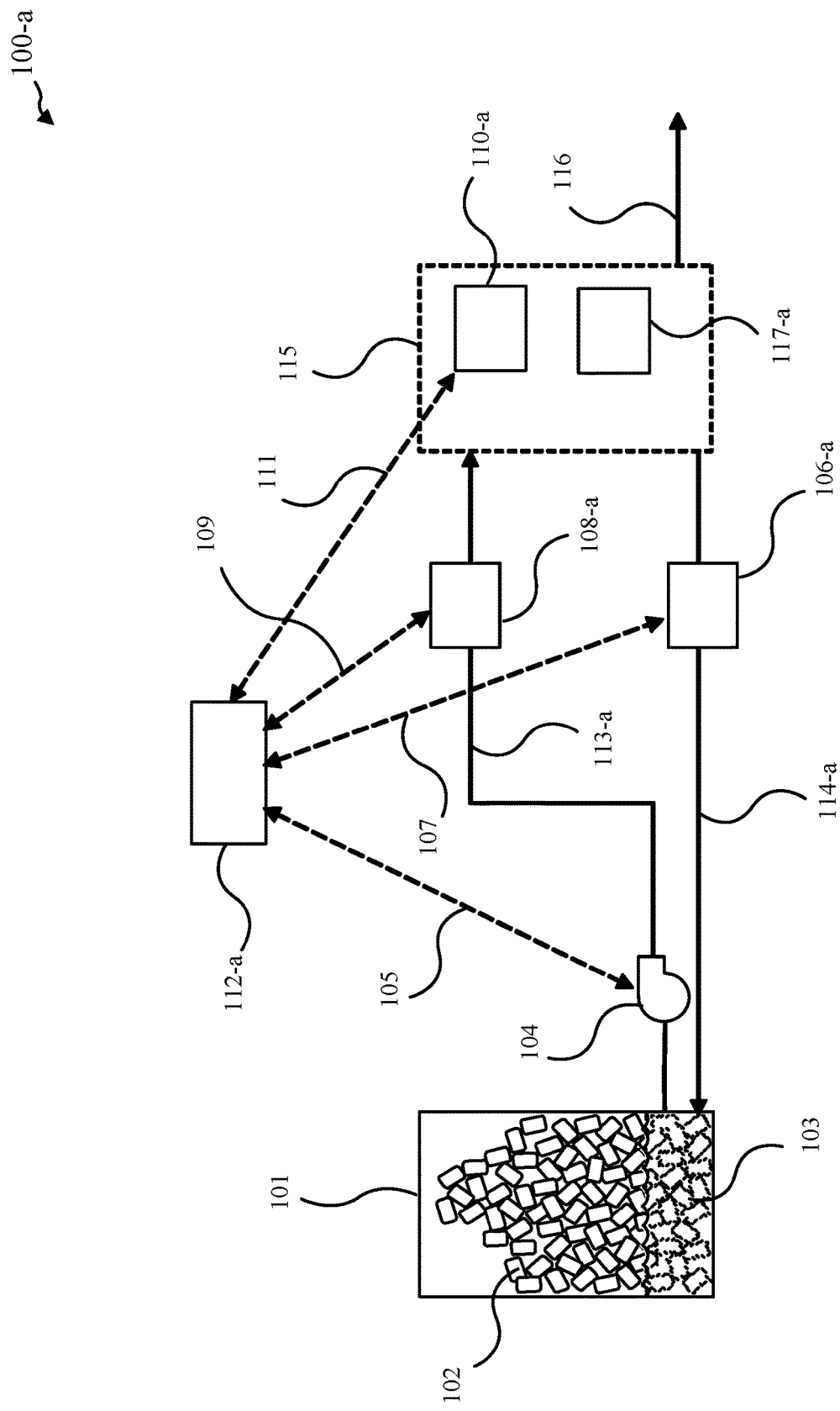
FIG. 2A shows a system in accordance with various embodiments.

FIG. 2A shows a system 100-a in accordance with various embodiments. System 100-a of FIG. 2A may be an example of system 100 of FIG. 1. A mixing vessel 101 may hold a solid 102 and a liquid 103, which may be a mixture of the melted solid and a freeze point suppressant. The liquid 103 may be extracted from the mixing vessel 101, which may be referred to as a tank in general, by a pump 104 as a dilute mixture 113-a (which may be referred to as a liquid in general or a dilute freeze point suppressant). The pump 104 may create the flow of liquid 113-a based on an electronic signal 105 from the controller 112-a. If liquid 113-a may be flowing in this line, it may flow through a sensor 108-a, which may be responsible for reporting an indicator value of a freeze point property of the liquid 113-a to the controller 112-a. This indicator value may be sent via an electronic signal 109, which may be a wired or wireless signal. The liquid 113-a may then flow to a separation system 115, where it may interact with a flow controller 110-a that may dictate its flow under control of the controller 112-a via an electronic signal 111; while flow controller 110-a may be shown as part of separation system 115, it may be separate from separation system 115 in some embodiments. At this dictated flow, the separation system 115 may be able to appropriately separate, with separator 117-a, the mixture 113-a into pure or higher purity liquid 116, which may be re-solidified into the solid 102 in some embodiments, and concentrated freeze point suppressant 114-a, which may flow out of the separation system 115 into a second sensor 106-a, which may report an indicator value of a freeze point property of the concentrated freeze point suppressant 114-a to the controller 112-a via an electronic signal 107. In some embodiments, liquid 116 may be a diluted freeze point suppressant. After passing through the high concentration side sensor 106-a, the concentrated freeze point suppressant 114-a may flow back to the tank 101. In general, the electronic signals 105, 107, 109, and/or 111 may include wired or wireless signals.

Figure 2B:
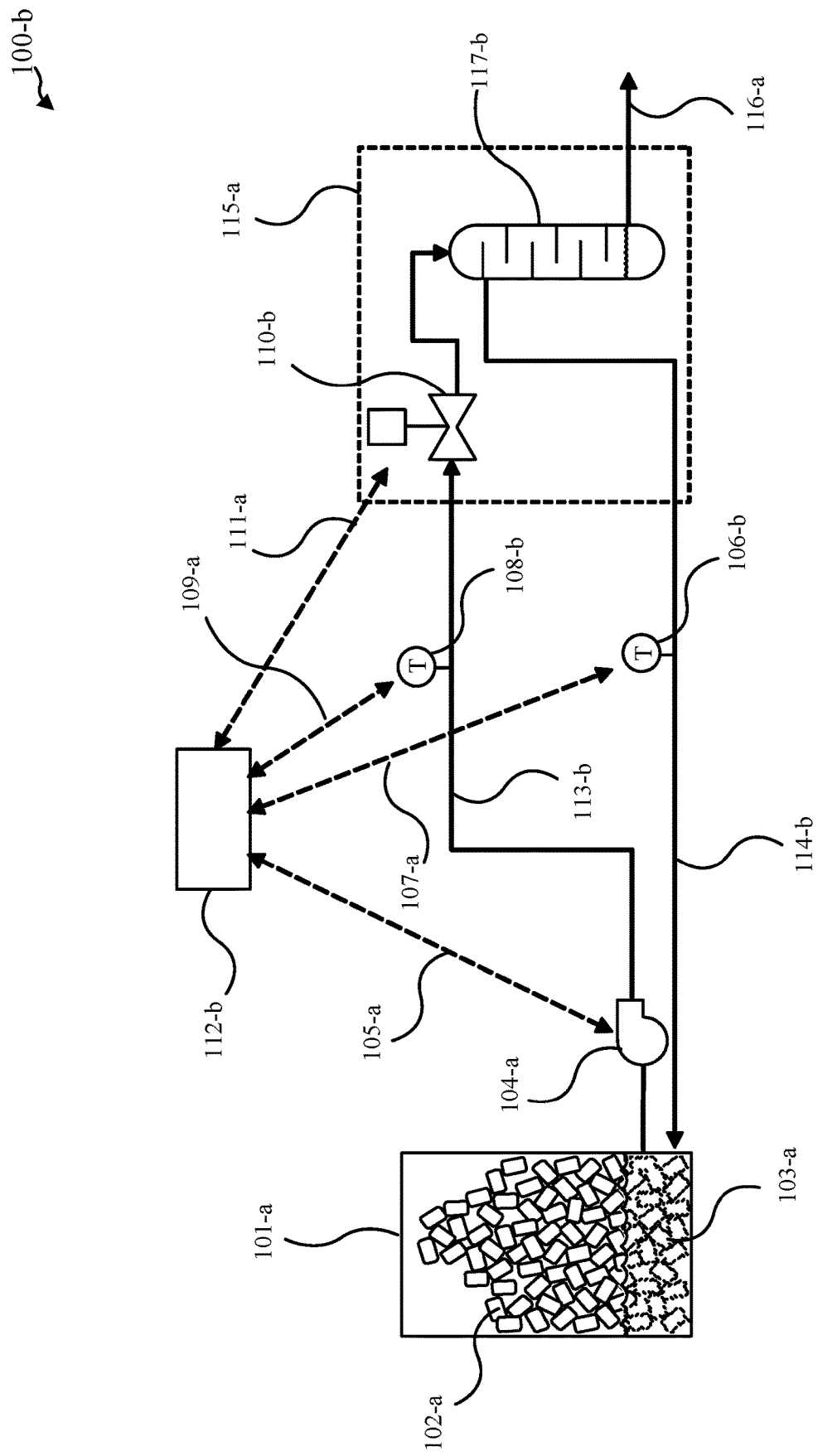
FIG. 2B shows a system in accordance with various embodiments.

FIG. 2B shows a system 100-b that may be a specific embodiment of a freeze point suppression control architecture that may involve a single speed pump 104-a, two temperature sensors 108-b, 106-b, and a control valve 110-b. System 100-b of FIG. 2B may be an example of system 100 of FIG. 1 or system 100-a of FIG. 2A. A mixing vessel 101-a may hold a solid 102-a and a liquid 103-a that may be a mixture of the melted solid and a freeze point suppressant. The liquid 103-a may be extracted from the mixing vessel 101-a, which may also be referred to as a tank, by a single speed pump 104-a as a dilute mixture 113-b, which may be referred to as a liquid. The pump 104-a may create a flow of liquid 113-b, which may also be considered liquid 103-a, based on an electronic signal 105-a from a controller 112-b. If liquid may be flowing in this line, it may flow through a temperature sensor 108-b, which may be responsible for reporting the temperature of the liquid 113-b to the controller 112-b. This indicator value of a freeze point suppressant property of the liquid 113-b may be sent via an electronic signal 109-a. The fluid 113-b may then flow to a separation system 115-a, where it may interact with a control valve 110-b, which may dictate its flow under control of the controller 112-b via an electronic signal 111-a. At this dictated flow, the separation system 115-a, which in this embodiment may include a distillation vessel 117-b, may be able to appropriately separate the mixture into pure or higher purity liquid 116-a, which may be re-solidified into the solid 102-a in some embodiments, and concentrated freeze point suppressant 114-b; in some embodiments, liquid 116-a may include a diluted freeze point suppressant. The concentrated freeze point suppressant 114-b may flow out of the distillation vessel 117-b into a second temperature sensor 106-b, which may report a temperature to the controller 112-b via an electronic signal 107-a; this temperature may be an indicator value of a freeze point suppressant property of the concentrated freeze point suppressant 114-b. After passing through the high concentration side sensor 106-b, the concentrated freeze point suppressant 114-b may flow back to the tank 101-a.

Figure 2C:
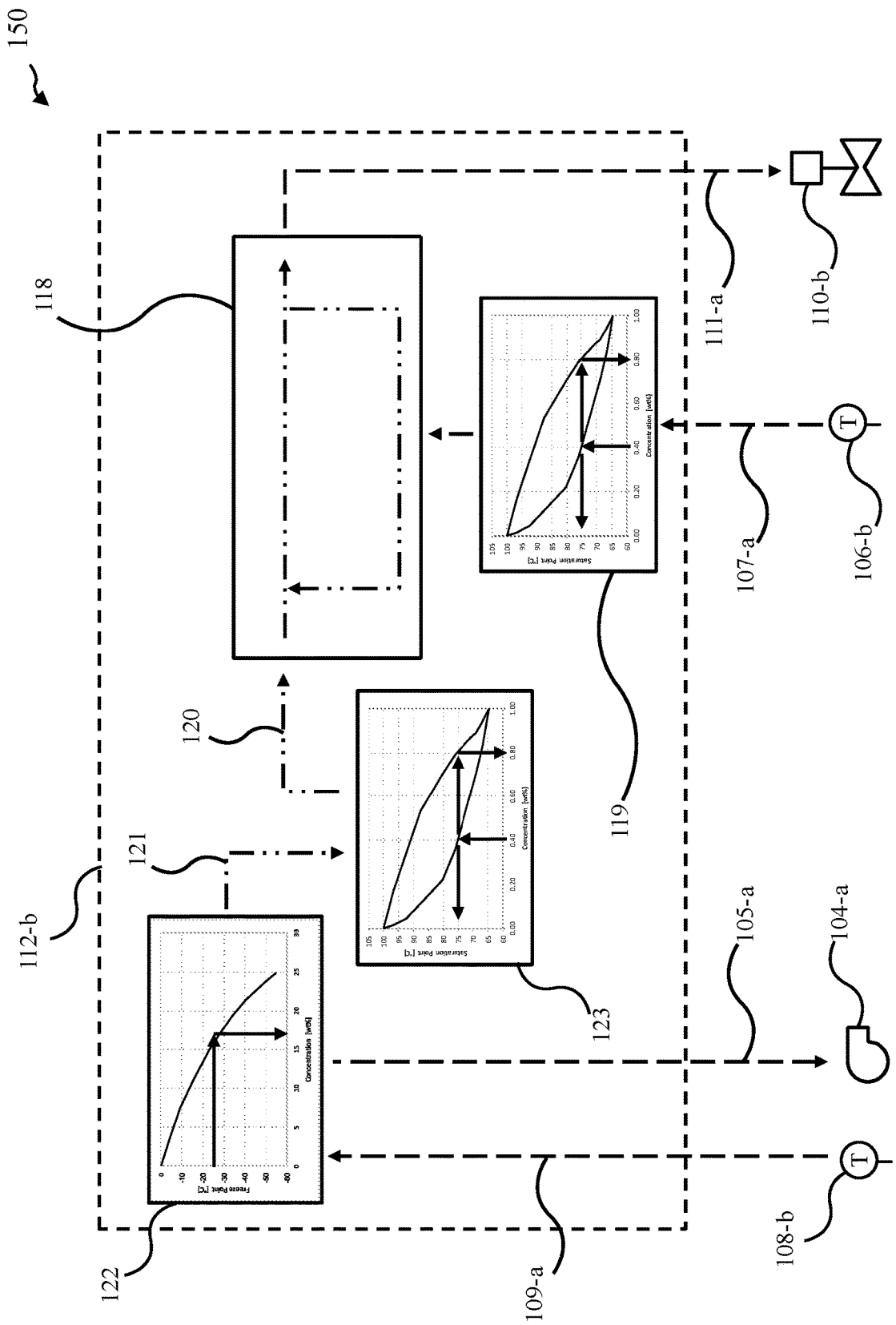
FIG. 2C shows control logic in accordance with various embodiments.

FIG. 2C shows control logic 150 that may be used by the control architecture in order to control the freeze point suppression cycle for different embodiments, such as system 100-b of FIG. 2B. For example, if implemented with respect to system 100-b of FIG. 2B, temperature sensor 108-b may report a temperature value to the controller 112b via electronic signal 109-a. The temperature signal received may be used to decide if the pump 104-a should be running. This decision may result in electronic signal 105-a being sent to the pump 104-a. The temperature signal may also be interpreted by the controller 112-b via a property based algorithm 122 that may return a concentration value 121. This concentration value 121 may then be fed into a second property based algorithm 123, which may return target information 120 to a main proportional integration differential control loop 118. This loop may utilize feedback control from the second temperature sensor 106-b, which may be sent via electronic signal 107-a and may be interpreted through a property based algorithm 119. The result of this control loop may be electronic signal 111-a sent to the control valve 110-b that may modulate the flow of dilute freeze point suppressant into the distillation vessel and may maintain proper operation of that equipment in order to achieve the target concentration at the inlet to the mixing vessel.

Figure 3A:
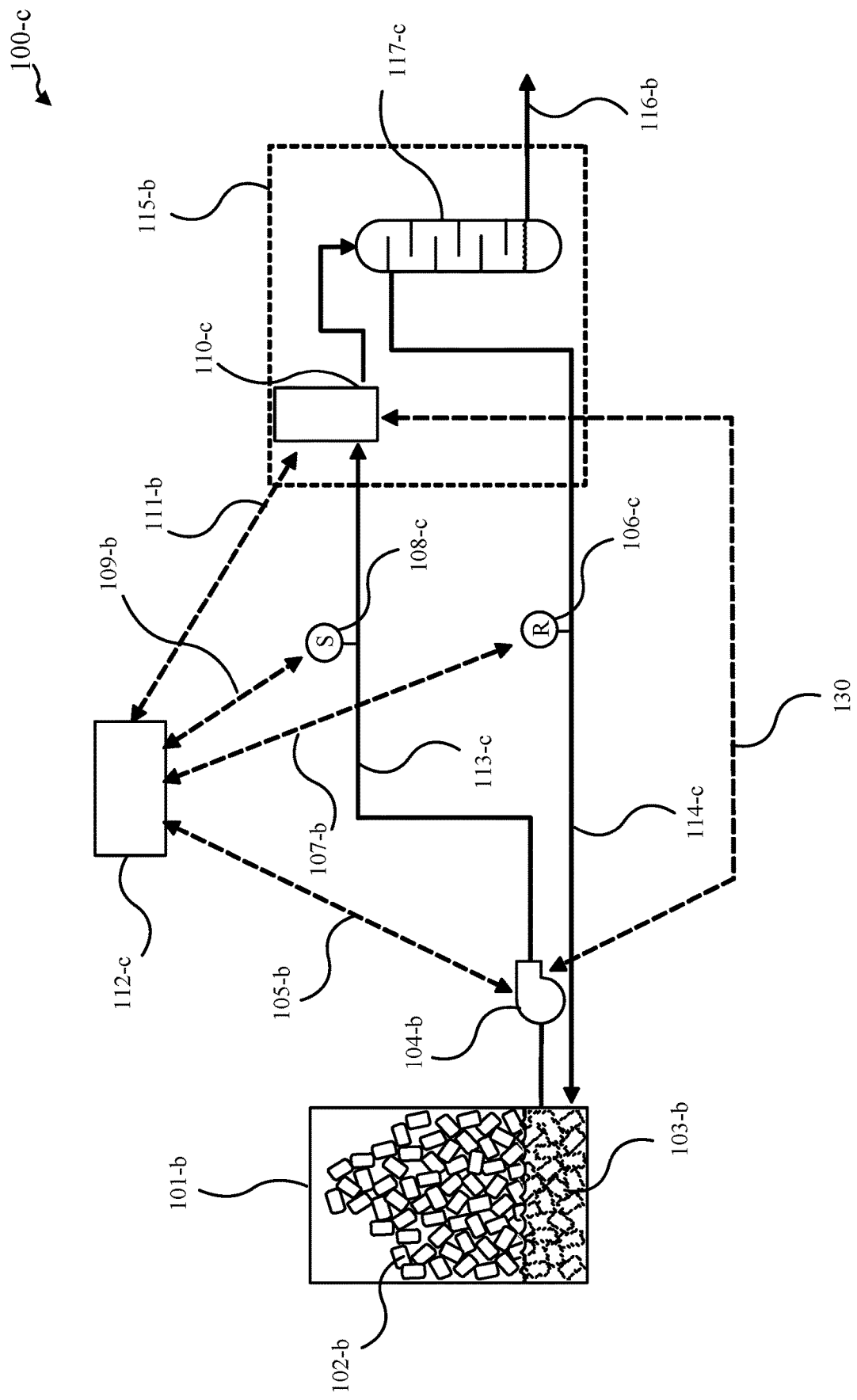
FIG. 3A shows a system in accordance with various embodiments.

FIG. 3A shows a system 100-c for a freeze point suppression control architecture that may involve a variable speed pump 104-b, a spectrometer 108-c, a refractometer 106-c, and controller 112-c. System 100-c of FIG. 3A may be an example of system 100 of FIG. 1 and/or system 100-a of FIG. 2A. A mixing vessel 101-b, which may also be referred to as a tank, may holds a solid 102b and a liquid 103-b, that may be a mixture of the melted solid and a freeze point suppressant. The liquid 103-b can be extracted from the tank 101-b by the variable speed pump 104-b as a dilute mixture 113-c, which may be referred to as a liquid. The pump 104-b may create or may not create the flow of liquid 113-b based on an electronic signal 105-b from the controller 112-c, but this signal 105-b may not necessarily set the pump's speed. If liquid 113-c may be flowing in this line, it may flow through a spectrometer sensor 108-c, which may be responsible for reporting the spectral signature of the liquid 113-c to the controller 112-c. This indicator value may be sent via an electronic signal 109-b. The liquid 113-c may then flow to a separation system 115-b, where its flow rate may be dictated by a motor speed controller 110-c, which may send an electronic signal 130 to the variable speed motor of pump 104-b and may set the flow rate of liquid 113-c through the separation system 115-b. At this flow control, the separation system 115-b, which in this embodiment may include a distillation vessel 117-c, may be able to appropriately separate the mixture into pure or higher purity liquid 116-b, which may be re-solidified into the solid 102-b in some embodiments, and concentrated freeze point suppressant 114-c; in some embodiments, liquid 116-b is a diluted freeze point suppressant. The concentrated freeze point suppressant 114-c may flow out of the distillation vessel 117-c into a refractometer 106-c, which may report the refractive index to the controller 112-c via an electronic signal 107-b. After passing through the high concentration side sensor 106-c, the concentrated freeze point suppressant 114-c may flow back to the tank 101-b.

Figure 3B:
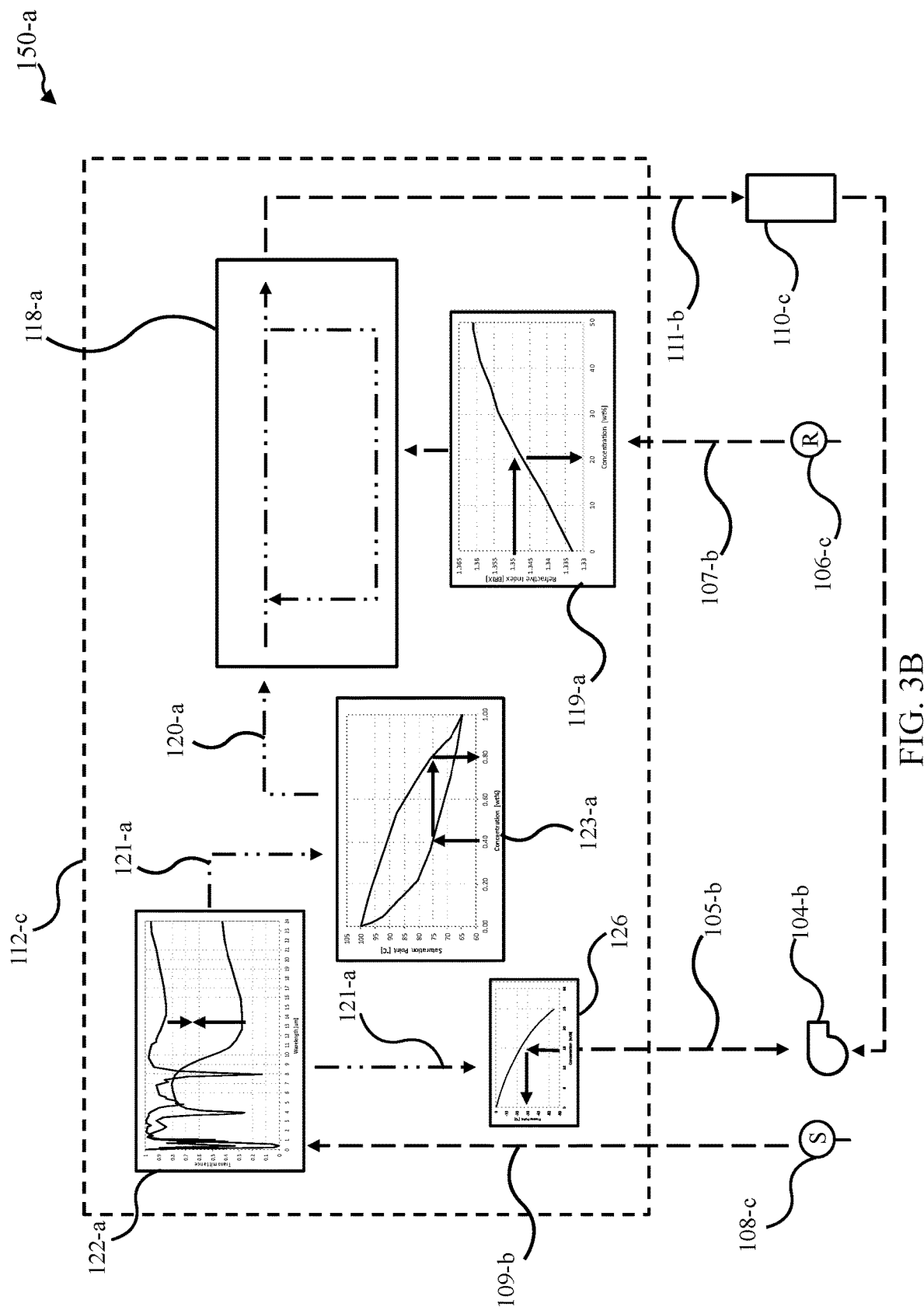
FIG. 3B shows control logic in accordance with various embodiments.

FIG. 3B shows control logic 150-a that may be used by the control architecture in order to control the freeze point suppression cycle for different embodiments, such as system 100-c of FIG. 3A. For example, if implemented with respect to system 100-c of FIG. 3A, spectrometer 108-c may report a spectral signal to the controller 112-c via electronic signal 109-b. The spectral signal received may be interpreted via a property based algorithm 122-a and may produce a concentration value 121-a. This concentration value 121-a may be used by another property based algorithm 126 to determine a temperature of the mixing vessel and if the pump 104-b should be turned on or off. This decision may be captured in the electronic signal 105-b and may be sent to the pump 104-b. Additionally, this concentration value 121-a may then be fed into a second property based algorithm 123-a that may return target information 120-a to the main proportional integration differential control loop 118-a. This loop 118-a may involve feedback control from the refractometer sensor 106-c, which may be sent via electronic signal 107-b and interpreted through a property based algorithm 119-a. The result of this control loop 118-a may include electronic signal 111-b being sent to the speed controller 110-c, which may modulate the flow of dilute freeze point suppressant into the distillation vessel via the variable speed pump 104-b and may maintain proper operation of that equipment in order to achieve the target concentration at the inlet to the mixing vessel.

Figure 4A:
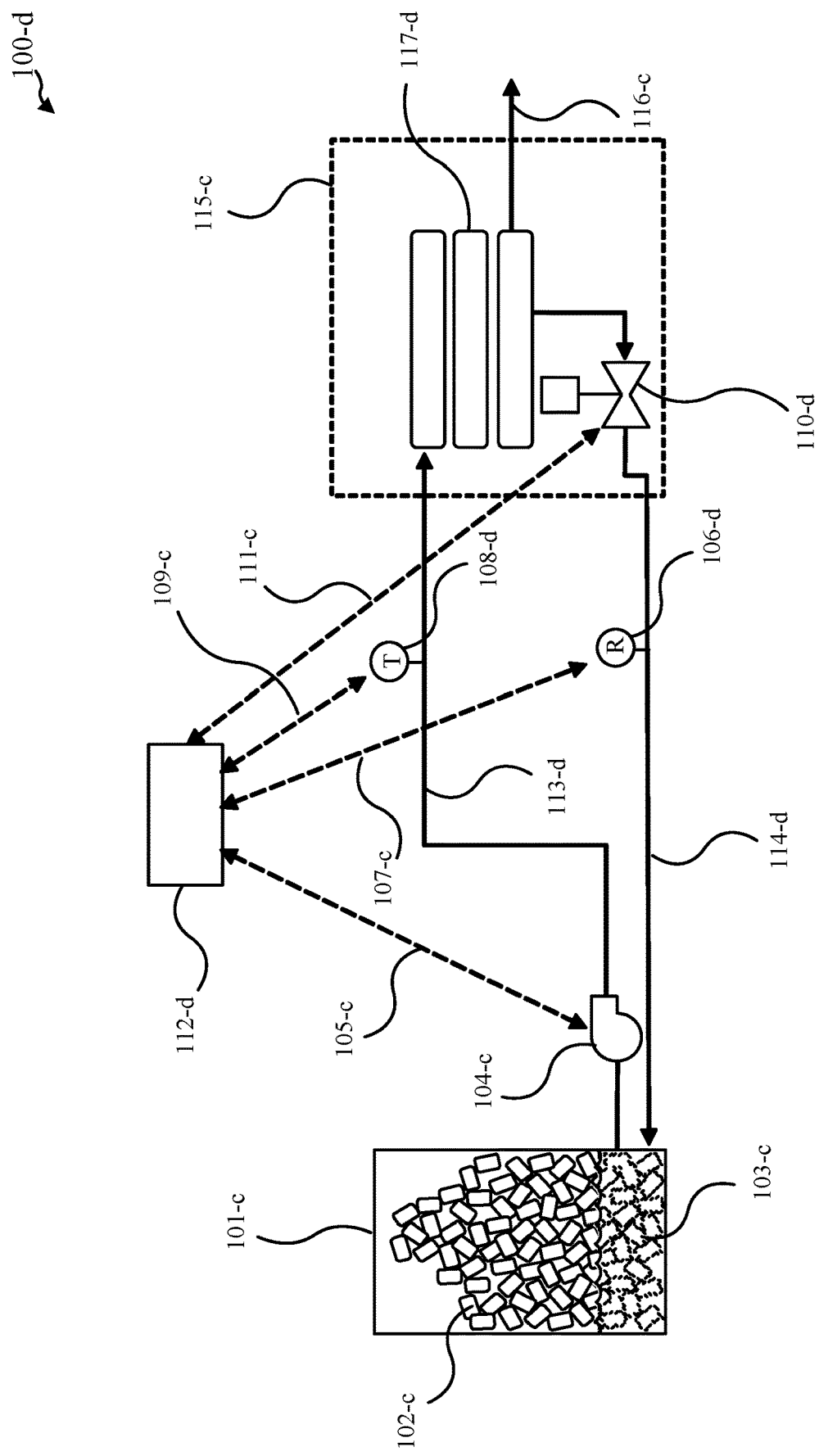
FIG. 4A shows a system in accordance with various embodiments.

FIG. 4A shows an embodiment of a system 100-d for a freeze point suppression control architecture that may involve a single speed pump 104-c, a temperature sensor 108-d, a refractometer 106-d, and a control valve 110-d. System 100-d of FIG. 4A may be an example of system 100 of FIG. 1 and/or system 100-a of FIG. 2A. A mixing vessel 101-c, which may be referred to as a tank, may hold a solid 102-c and a liquid 103-c, which may be a mixture of the melted solid and a freeze point suppressant. The liquid 103-c may be extracted from the tank 101-c by the single speed pump 104-c as a dilute mixture 113-d, which may be a portion of the liquid 103-c. The pump 104-c may create the flow of liquid 113-d based on an electronic signal 105-c from the controller 112-d. If liquid 113-d is flowing in this line, it may flow through a temperature sensor 108-d, which may be responsible for reporting the temperature of the liquid 113-d to the controller 112-d. This indicator value may be sent via an electronic signal 109-c. The liquid 113-d may then flow to a separation system 115-c. Before interacting with the control valve 110-d, the liquid 113-d may first pass through a reverse osmosis membrane 117-d, where, at an elevated pressure, it may separate into an appropriately concentrated freeze point suppressant 114-d and a pure or higher purity liquid 116-c, which may be refrozen to form the solid 102-c in some embodiments; liquid 116-c may include a diluted freeze point suppressant in some embodiments. The pressure may be maintained by the control valve 110-d, which may be controlled by an electronic signal 111-c. The appropriately concentrated freeze point suppressant 114-d may then flow back to the mixing vessel 101-c, while passing through a refractometer 106-d, which may report its refractive index via an electronic signal 107-c to the controller 112-d.

Figure 4B:
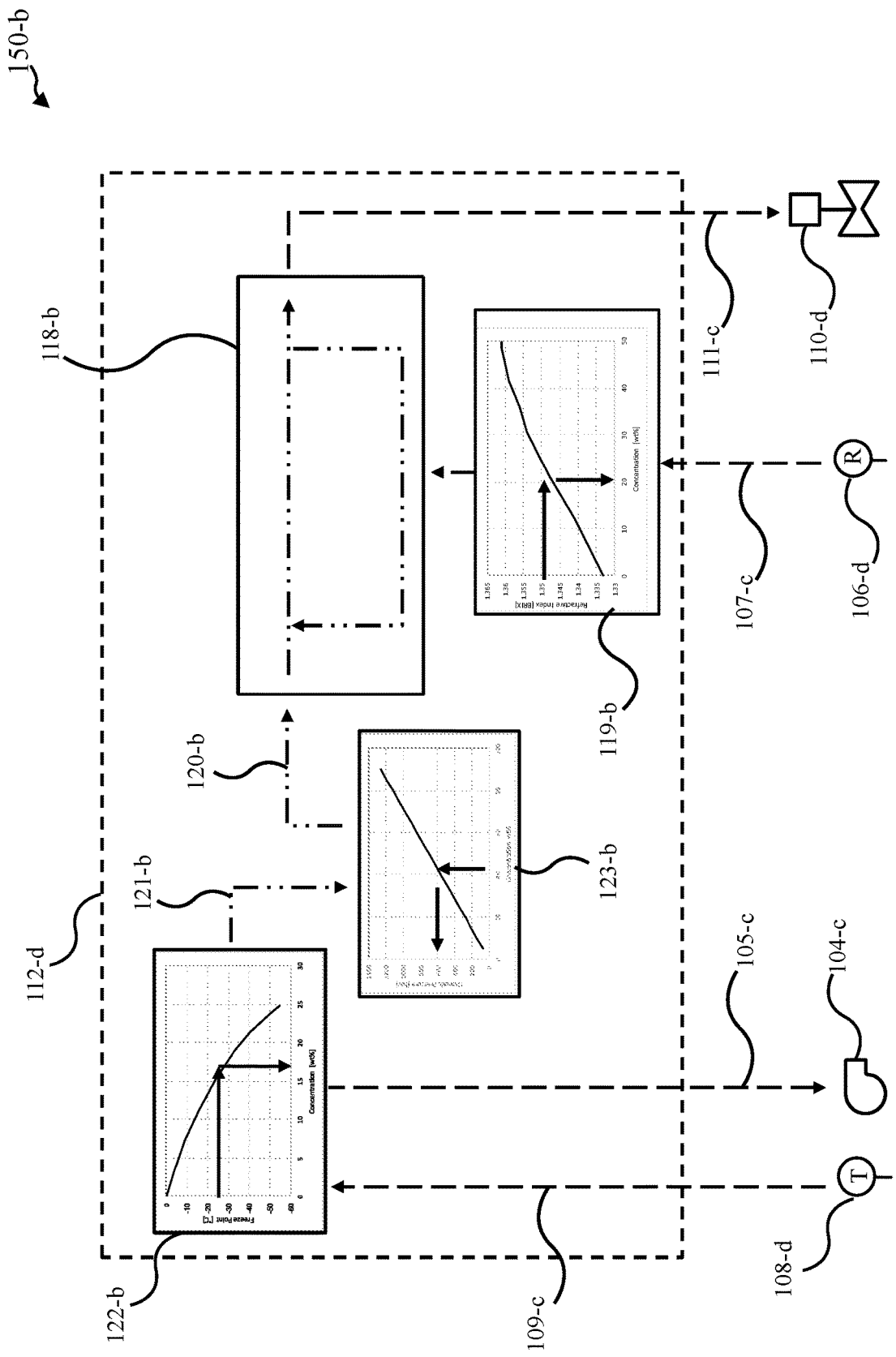
FIG. 4B shows control logic in accordance with various embodiments.

FIG. 4B shows control logic 150-b that may be used by the control architecture in order to control the freeze point suppression cycle for different embodiments, such as system 100-d of FIG. 4A. For example, if implemented with respect to system 100-d of FIG. 4A, temperature sensor 108-d may report a temperature value to the controller 112-d via electronic signal 109-c. The temperature signal received may be used to decide if the pump 104-c should be running. This decision may result in electronic signal 105-c being sent to the pump 104-c. The temperature signal may also be interpreted by the controller 112-d via a property based algorithm 122-b, which may return a concentration value 121-b. This concentration value 121-b can then be fed into a second property based algorithm 123-b, which may return target information 120-b to the main proportional integration differential control loop 118-b. This loop 118-b may involve feedback control from the refractometer 106-d, which may be sent via electronic signal 107-*c* and may be interpreted through a property based algorithm 119-*b*. The result of this control loop 118-*b* may include electronic signal 111-*c*, which may be sent to the control valve 110-*d*, which may modulate the flow of dilute freeze point suppressant into the reverse osmosis filters and may maintain proper operation of that equipment in order to achieve the target concentration at the inlet to the mixing vessel.

Figure 5A:
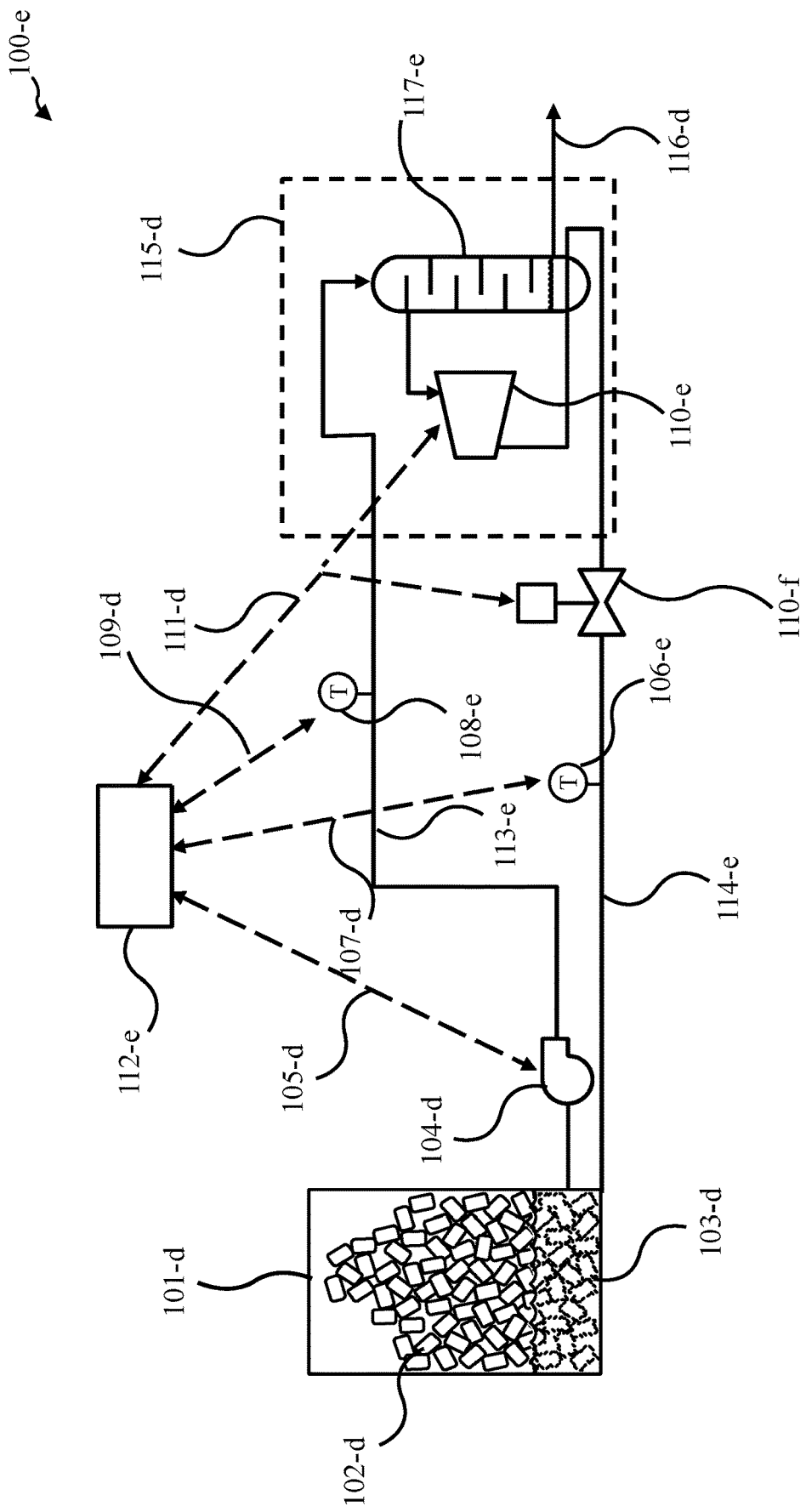
FIG. 5A shows a system in accordance with various embodiments.

FIG. 5A shows a system 100-*e* in accordance with various embodiments for a freeze point suppression control architecture that may involve a single speed pump 104-*d*, two temperature sensors 108-*e*, 106-*e*, and a variable speed compressor 110-*e*. System 100-*e* of FIG. 5A may be an example of system 100 of FIG. 1 and/or system 100-*a* of FIG. 2A. A mixing vessel 101-*d*, which may be referred to as a tank, may hold a solid 102-*d* and a liquid 103-*d*, which may be a mixture of the melted solid and a freeze point suppressant. The liquid 103-*d* may be extracted from the tank 101-*d* by a single speed pump 104-*d* as a dilute mixture 113-*e*, which may be a portion of liquid 103-*d*. The pump 104-*d* may create the flow of liquid 113-*e* based on an electronic signal 105-*d* from the controller 112-*e*. If liquid 113-*e* may be flowing in this line, it may flow through the temperature sensor 108-*e*, which may be responsible for reporting the temperature of the liquid 113-*e* to the controller 112-*e*. This indicator value may be sent via an electronic signal 109-*d*. The fluid 113-*e* may then flow to a separation system 115-*d*, where it may enter a distillation vessel 117-*e* through suction created by the variable speed compressor 110-*e*, which may act as a flow controller, that may be controlled via electronic signal 111-*d* from the controller 112-*e*. At this dictated flow, the separation system 115-*d*, which in this embodiment may include the distillation vessel 117-*e*, may be able to appropriately separate the mixture into pure or higher purity liquid 116-*d*, which may be re-solidified into the solid 102-*d* in some embodiments, and concentrated freeze point suppressant 114-*e*; liquid 116-*d* may include a diluted freeze point suppressant in some embodiments. The concentrated freeze point suppressant 114-*e* may flow through a second pass inside the distillation vessel 117-*e* and through the second temperature sensor 106-*e*, which may report another temperature to the controller 112-*e* via electronic signal 107-*d*; a control valve 110-*f* may facilitate the flow of concentrated freeze point suppressant 114-*e*. After passing through the high concentration side sensor 106-*e*, the concentrated freeze point suppressant 114-*e* may flow back to the tank 101-*d*.

Figure 5B:
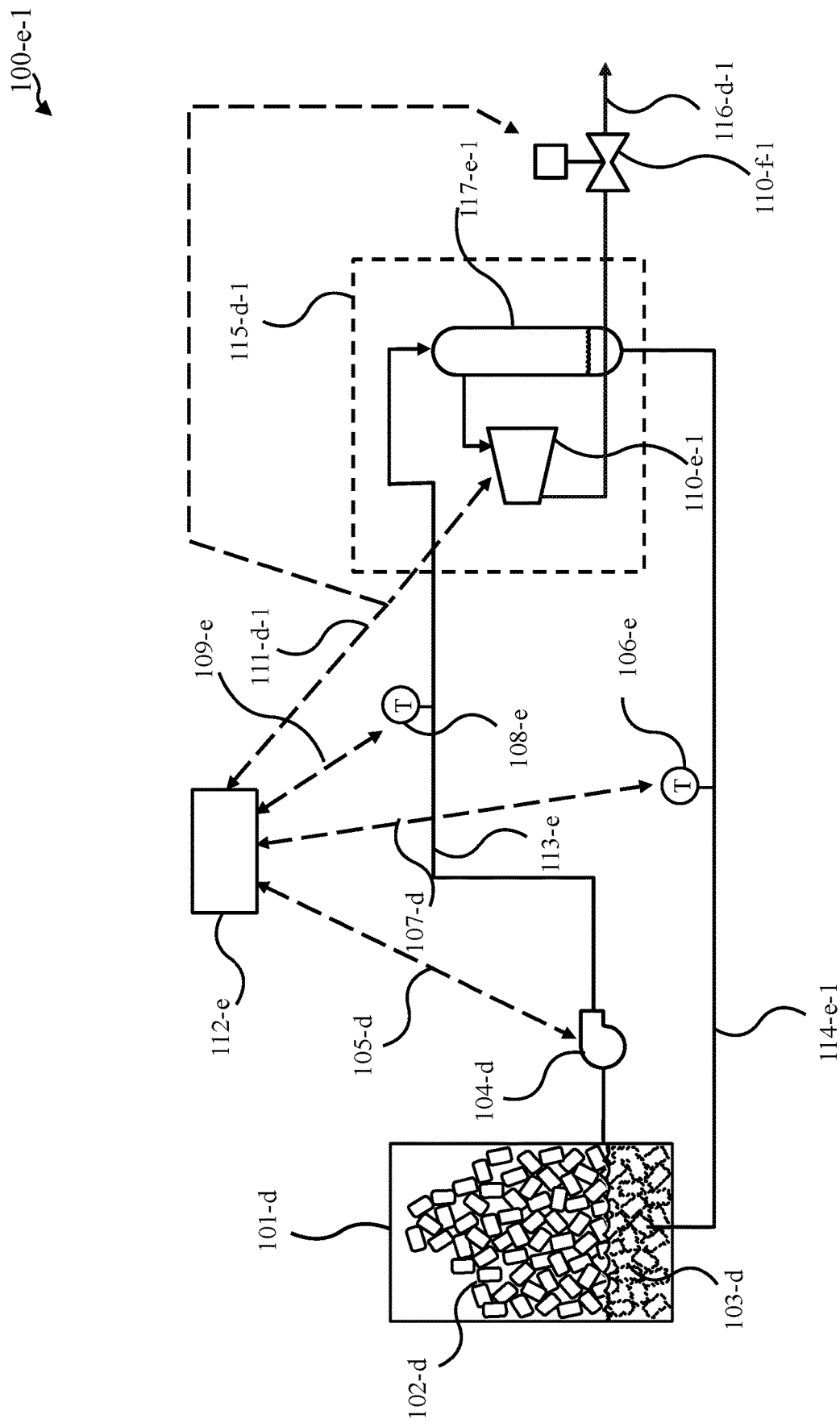
FIG. 5B shows a system in accordance with various embodiments.

FIG. 5B shows a variation of the system 100-*e* of FIG. 5A as system 100-*e*-1, providing another specific embodiment of a freeze point suppressant control architecture that may involve the single speed pump 104-*d*, the two temperature sensors 108-*e*, 106-*e*, and a variable speed compressor 110-*e*-1. The mixing vessel 101-*d* may hold the solid 102-*d* and the liquid 103-*d* that may be a mixture of the melted solid and a freeze point suppressant. The liquid can be extracted from the tank 101-*d* by the single speed pump 104-*d* as the dilute mixture 113-*d*. The pump 104-*d* may create the flow of liquid based on electronic signal 105-*d* from the controller 112-*e*. If liquid is flowing in this line, it may flow through the temperature sensor 108-*e*, which may be responsible for reporting the temperature of the liquid to the controller 112-*e*. This indicator value may be sent via electronic signal 109-*d*. The fluid then may flow to a separation system 115-*d*-1 where it may enter a distillation vessel 117-*e*-1 based on suction created by a variable speed compressor 110-*e*-1 that may be controlled via electrical signal 111-*d*-1 from the controller 112-*e*. At this dictated flow the separation system, which in this embodiment takes the form of a distillation vessel, may be able to appropriately separate the mixture into pure liquid 116-*d*-1 that may be re-solidified into the solid 102-*d* and concentrated freeze point suppressant 114-*e*-1. The concentrated freeze point suppressant 114-*e*-1 may flow through the second temperature sensor 106-*e*, which may report another temperature to the controller 112-*e* via electronic signal 107-*d*. After passing through the high concentration side sensor 106-*e*, the concentrated freeze point suppressant 114-*e*-1 may flow back to the tank 101-*d*. The variable speed compressor 110-*e*-1 may create a flow that passes through the distillation vessel 117-*e*-1 in a second pass. This may form a pure liquid 116-*d*-1 flow out of this pass that flows through a control valve 110-*f*-1.

Figure 5C:
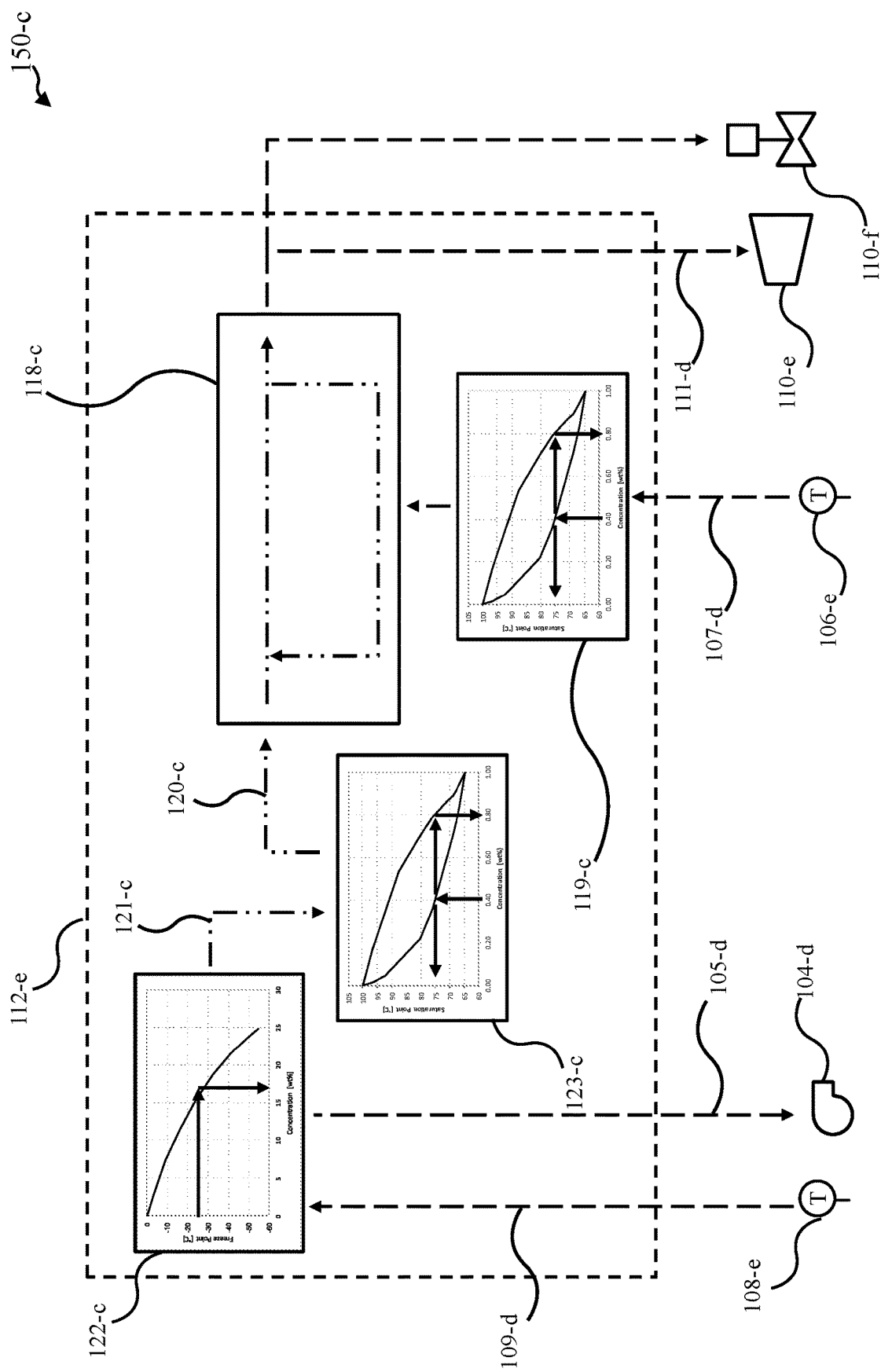
FIG. 5C shows control logic in accordance with various embodiments.

FIG. 5C shows control logic 150-*c* that may be used by the control architecture in order to control the freeze point suppression cycle for different embodiments, such as system 100-*e* of FIG. 5A and/or system 100-*e*-1 of FIG. 5B. For example, if implemented with respect to system 100-*e* of FIG. 5A or system 100-*e*-1 of FIG. 5B, temperature sensor 108-*e* may report a temperature value to the controller 112-*e* via an electronic signal 109-*d*. The temperature signal received may be used to decide if the pump 104-*d* should be running. This decision may result in electronic signal 105-*d* being sent to the pump 104-*d*. The temperature signal may also be interpreted by the controller 112-*e* via a property based algorithm 122-*c*, which may return a concentration value 121-*c*. This concentration value 121-*c* may then be fed into a second property based algorithm 123-*c*, which may return target information 120-*c* to a main proportional integration differential control loop 118-*c*. This loop 118-*c* may include feedback control from the second temperature sensor 106-*e*, which may be sent via an electronic signal 107-*d* and may be interpreted through a property based algorithm 119-*c*. The result of this control loop 118-*c* may include electronic signal 111-*d* (or 111-*d*-1 for system 100-*e*-1) being sent to the variable speed compressor 110-*e* (or 110-*e*-1 for system 100-*e*-1), which may modulate the flow of dilute freeze point suppressant into the distillation vessel 117-*e* (or 117-*e*-1 for system 100-*e*-1) and may maintain proper operation of that equipment in order to achieve the target concentration at the inlet to the mixing vessel. Electronic signal 111-*d* (or 111-*d*-1) may also sent to control valve 110-*f* (or 110-*f*-1).

These embodiments generally show the consistent application of the control hardware and software across multiple sensor types and multiple separation technologies. Regardless of the sensor type of separation technology, the control logic and hardware integration strategy may be applied to maintain the property concentration and temperature inside the mixing vessel and perform useful refrigeration at a temperature below the freezing point of the solid.

Figure 6A:
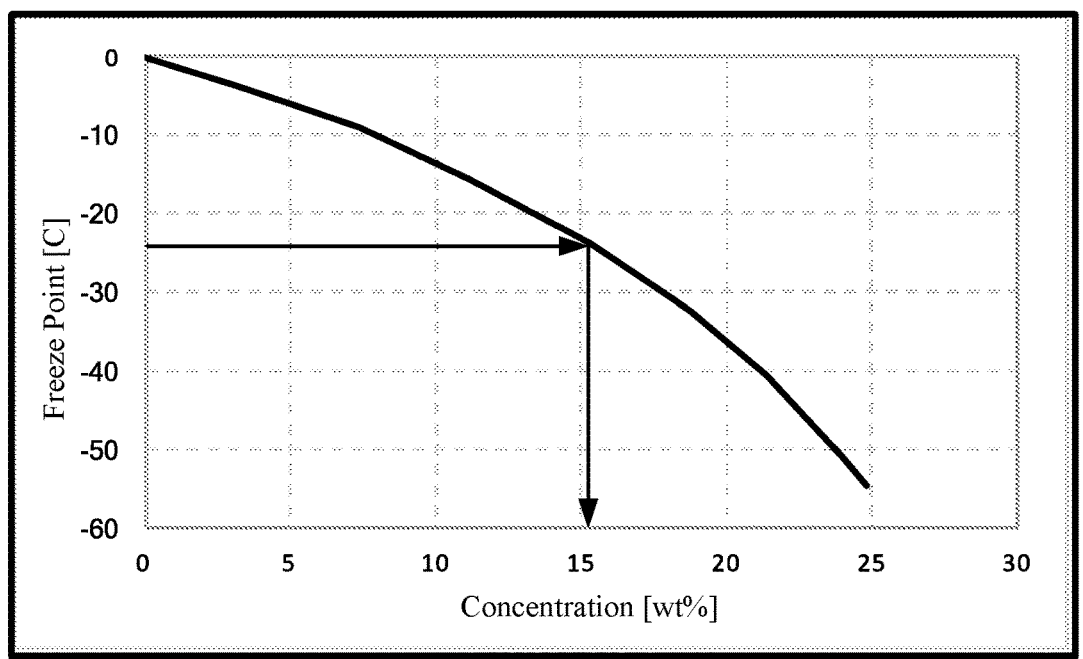
FIG. 6A shows property algorithm graphs in accordance with various embodiments.
Figure 6A:
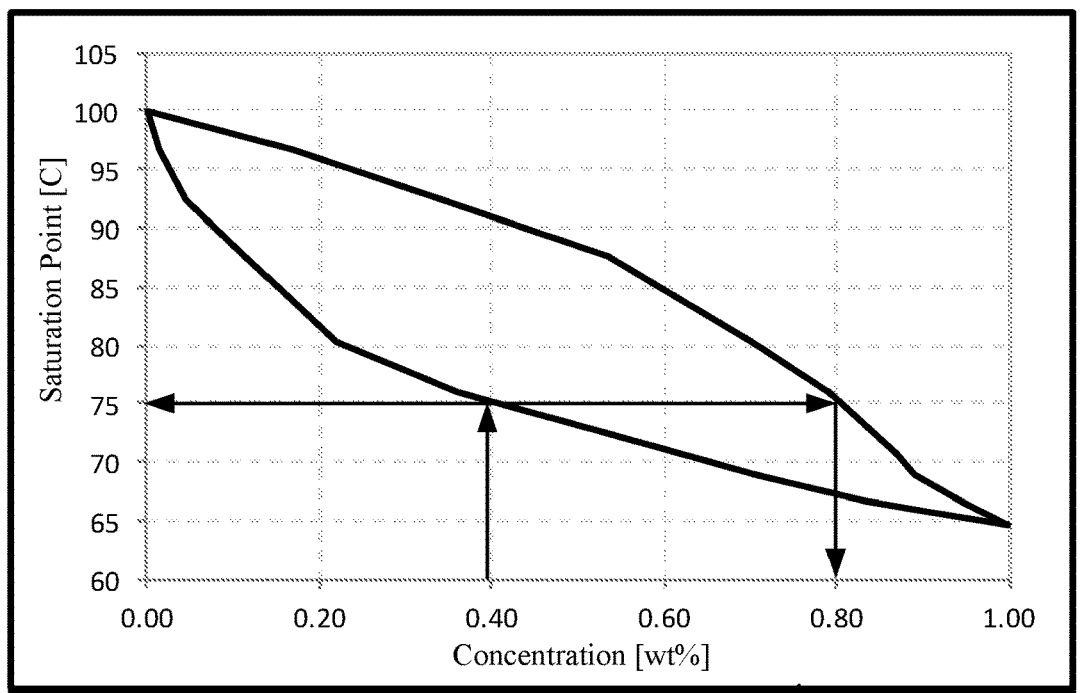
Figure 6B:
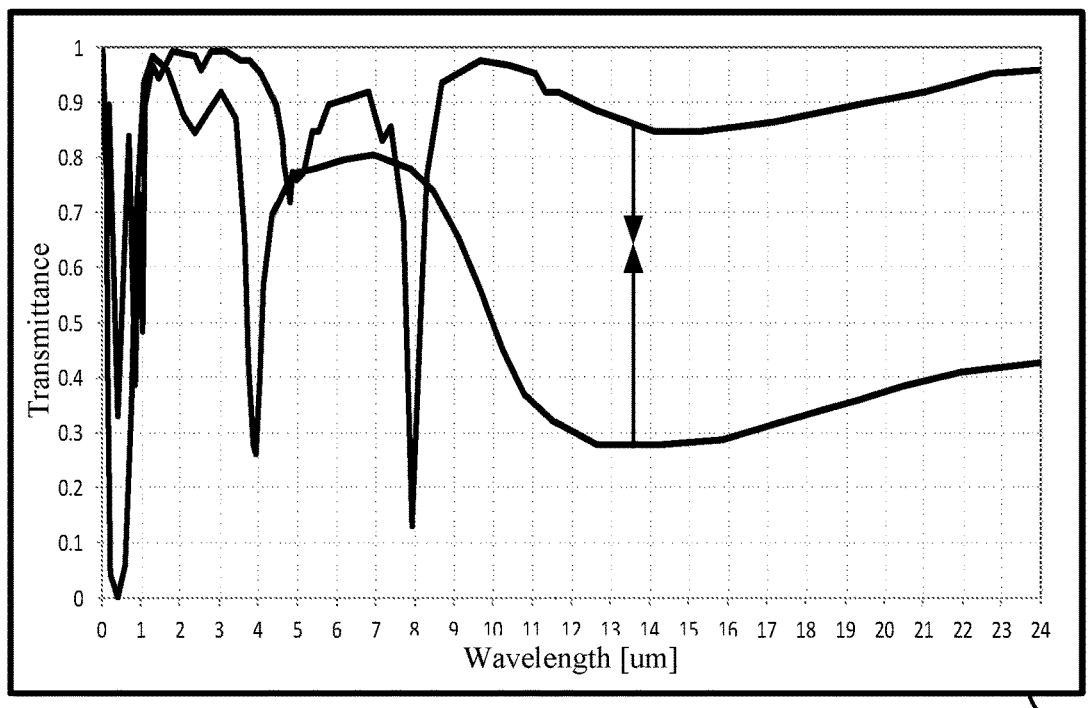
FIG. 6B shows property algorithm graphs in accordance with various embodiments.
Figure 6B:
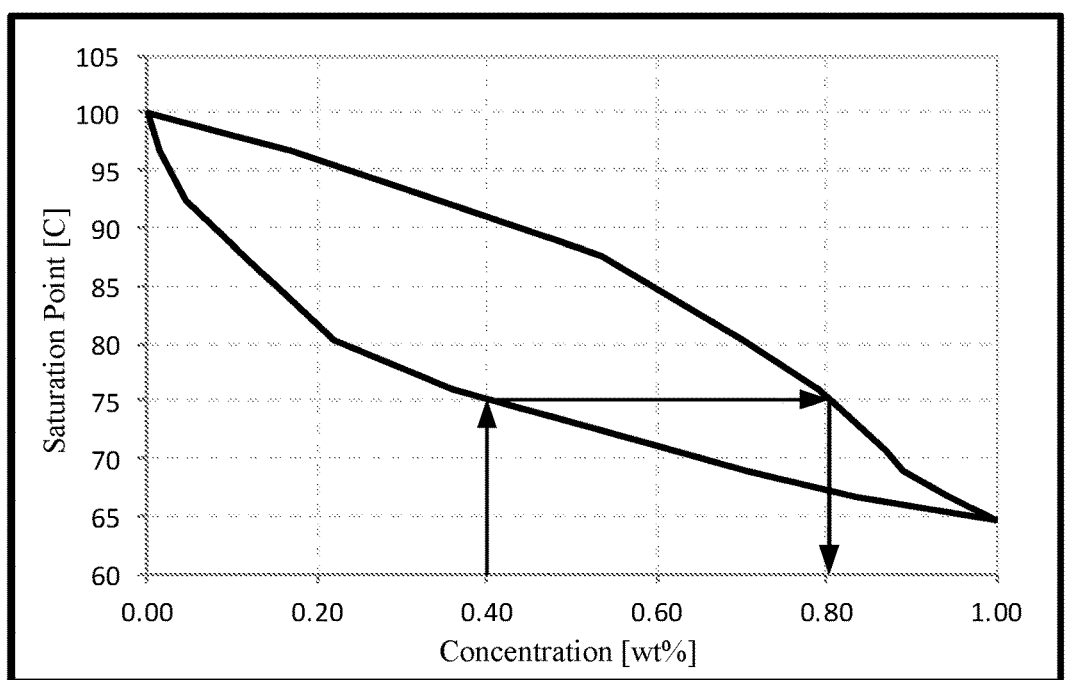
Figure 6C:
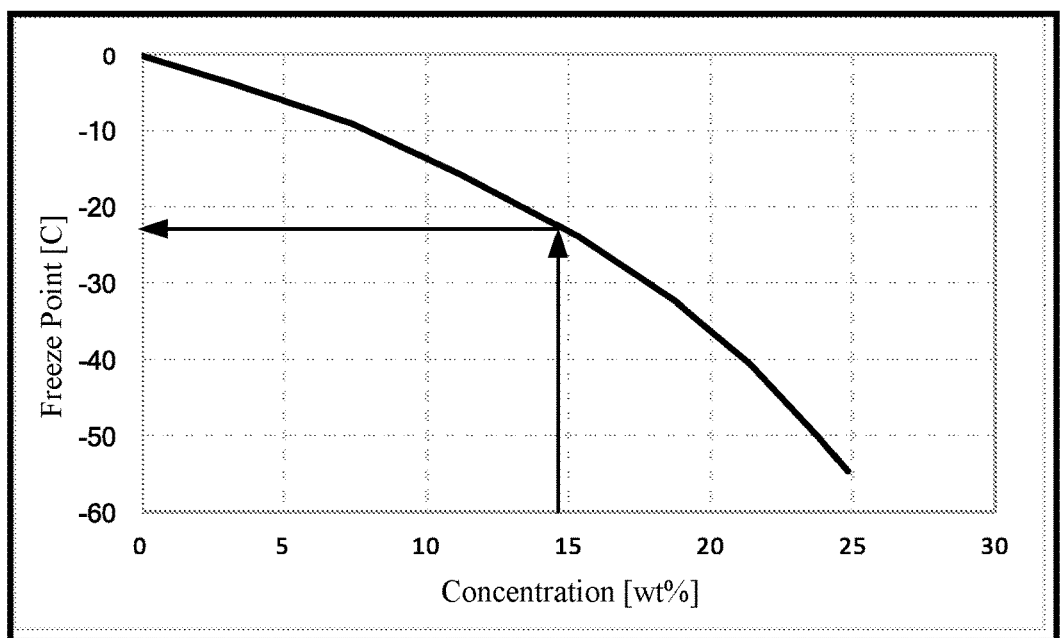
FIG. 6C shows property algorithm graphs in accordance with various embodiments.
Figure 6C:
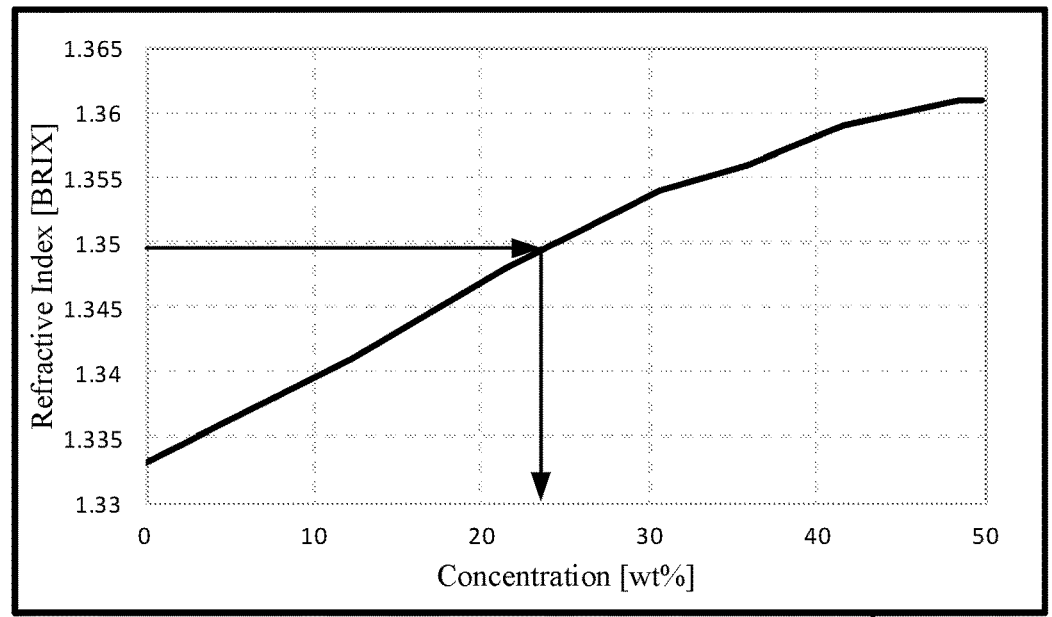
Figure 6D:
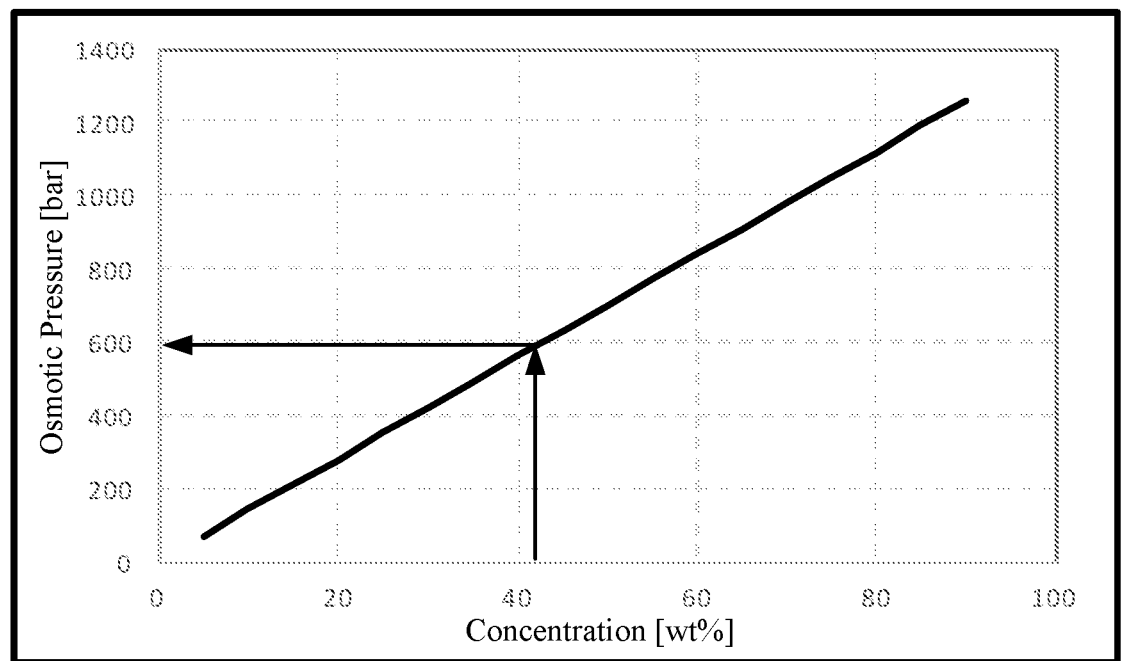
FIG. 6D shows a property algorithm graph in accordance with various embodiments.

Turning now to FIG. 6A, FIG. 6B, FIG. 6C, and FIG. 6D, examples of property algorithm graphs are provided in accordance with various embodiments that are generally related to FIG. 2C, FIG. 3B, FIG. 4B, and/or FIG. 5C. For example, FIG. 6A shows a graph 610 that may relate a freeze point with a concentration; this graph may represent the property algorithms 122 of FIG. 2C, 122-*b* of FIG. 4B, and/or 122-*c* of FIG. 5C. Graph 620 may relate concentration with saturation point; this graph may represent the property algorithms 123 of FIG. 2C, 119 of FIG. 2C, 119-*c* of FIG. 5C, and/or 123-*c* of FIG. 5C. FIG. 6B shows a graph 630 that may relate transmittance with wavelength; this graph may represent the property algorithm 122-*a* of FIG. 3B. Graph 640 may relate concentration with saturation point; this graph may represent the property algorithm 123-*a* of FIG. 3B. FIG. 6C shows a graph 650 that may relate concentration with freeze point; this graph may represent the property algorithm 109-*b* of FIG. 3B. Graph 660 may relate refractive index with concentration; this graph may represent the property algorithm 119-*a* of FIG. 3B and/or 119-*b* of FIG. 4B. FIG. 6D shows a graph 670 that may relate concentration with osmotic pressure; this graph may represent the property algorithm 123-*b* of FIG. 4B. Graphs 610, 620, 630, 640, 650, 660, and 670 merely provide examples of the property algorithms that may be utilized in various embodiments; some embodiments may utilize different property algorithms.

Figure 7A:
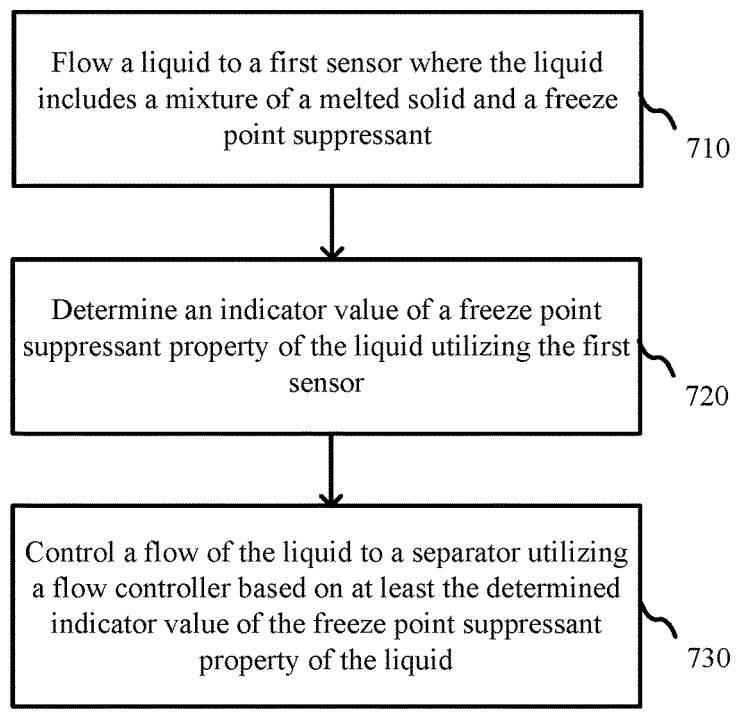
FIG. 7A shows a flow diagram of a method in accordance with various embodiments.

Turning now to FIG. 7A, a flow diagram of a method 700 is shown in accordance with various embodiments. Method 700 may be implemented utilizing a variety of systems, control logics, and/or devices such as those shown and/or described with respect to FIG. 1, FIG. 2A, FIG. 2B, FIG. 2C, FIG. 3A, FIG. 3B, FIG. 4A, FIG. 4B, FIG. 5A, FIG. 5B, FIG. 5C, FIG. 6A, FIG. 6B, FIG.6 C, and/or FIG. 6D. The method 700 may be referred to as a method of freeze point suppression cycle control.

At block 710, a liquid may flow to a first sensor; the liquid may include a mixture of a melted solid and a freeze point suppressant. At block 720, an indicator value of a freeze point suppressant property of the liquid may be determined utilizing the first sensor. At block 730, a flow of the liquid to a separator may be controlled utilizing a flow controller based on at least the determined indicator value of the freeze point suppressant property of the liquid; the separator may form a concentrated freeze point suppressant from the liquid. In some embodiments, the separator may form the concentrated freeze point suppressant from the liquid by separating at least a portion of the freeze point suppressant from the liquid; this may also form a dilute freeze point suppressant. In some embodiments, the separator may form the concentrated freeze point suppressant from the liquid through separating at least a portion of the melted solid from the liquid; this may form a pure or higher purity melted solid in some embodiments.

In some embodiments, the method 700 may include: determining a target property value of the concentrated freeze point suppressant based on the determined indicator value of the freeze point suppressant property of the liquid; determining an indicator value of a freeze point suppressant property of the concentrated freeze point suppressant utilizing a second sensor; and/or controlling further the flow of the liquid to the separator utilizing the flow controller based on at least the determined indicator value of the freeze point suppressant property of the concentrated freeze point suppressant and the determined target property value of the concentrated freeze point suppressant.

In some embodiments of method 700, determining the indicator value of the freeze point suppressant property of the liquid includes determining a temperature value of the liquid utilizing the first sensor and determining the indicator value of the freeze point suppressant property of the concentrated freeze point suppressant includes determining a temperature value of the concentrated freeze point suppressant utilizing the second sensor; the first sensor may include a temperature sensor and the second sensor may include a temperature sensor. In some embodiments, determining the indicator value of the freeze point suppressant property of the liquid includes determining a spectral signature of the liquid utilizing the first sensor and determining the indicator value of the freeze point suppressant property of the concentrated freeze point suppressant includes determining a refractive index of the concentrated freeze point suppressant utilizing the second sensor; the first sensor may include a spectrometer and the second sensor may include a refractometer. In some embodiments, determining the indicator value of the freeze point suppressant property of the liquid includes determining a temperature of the liquid utilizing the first sensor and determining the indicator value of the freeze point suppressant property of the concentrated freeze point suppressant includes determining a refractive index of the concentrated freeze point suppressant utilizing the second sensor; the first sensor may include a temperature sensor and the second sensor may include a refractometer.

Some embodiments of method 700 may utilize sensors for the first sensor and the second sensor that may include combinations or permutations of sensors configured to determine or facilitate determining temperature, spectrum, refractive index, density, concentration, conductivity, capacitance, pressure, heat capacity, freezing point, or boiling point, for example.

Some embodiments of method 700 include pumping the liquid from a tank to the first sensor; the liquid may be formed in the tank through combining the freeze point suppressant and a solid that forms the melted solid. Some embodiments include forming the concentrated freeze point suppressant from the liquid utilizing the separator. Some embodiments include combining the concentrated freeze point suppressant with a solid to form a portion of the liquid.

In some embodiments, the separator includes a distillation vessel; for example, some embodiments may utilize a distillation column. The separator may include at least a mechanical separator or a thermal separator. Some embodiments may utilize separators such as an opened kettle boiler, a recirculating plate boiler and separator, and/or a random-packed distribution column.

A wide variety of separation techniques may be utilized with method 700, including, but are not limited to: reverse osmosis, nano-filtration, photonic driven precipitation, precipitation by chemical reaction, precipitation by solubility change, surfactant absorption, ion exchange, activated carbon absorption, flash separation, distillation, multi-effect distillation, vapor compression distillation, evaporation, membrane distillation, and/or gas permeable membrane separation.

In some embodiments of method 700, the indicator value of the freeze point suppressant property of the liquid includes at least a concentration value of the liquid, a density value of the liquid, a conductivity value of the liquid, a capacitance value of the liquid, a refractive index value of the liquid, a temperature value of the liquid, a pressure value of the liquid, a heat capacity value of the liquid, a freezing point value of the liquid, or a boiling point value of the liquid. In some embodiments, the target property value of the concentrated freeze point suppressant includes least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant. In some embodiments, the indicator value of the freeze point suppressant property of the concentrated freeze point suppressant includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant.

In some embodiments of method 700, forming the concentrated freeze point suppressant from the liquid utilizing the separator includes at least separating at least a portion of the freeze point suppressant from the liquid or separating at least a portion of the melted solid from the liquid. In some embodiments, the flow controller includes a variable-speed compressor that creates suction with respect to the distillation vessel. Some embodiments include flowing the concentrated freeze point suppressant through a control valve coupled with the controller that control at least a flow of the concentrated freeze point suppressant from the distillation vessel or a flow of liquid from the distillation vessel to reform the melted solid.

Figure 7B:
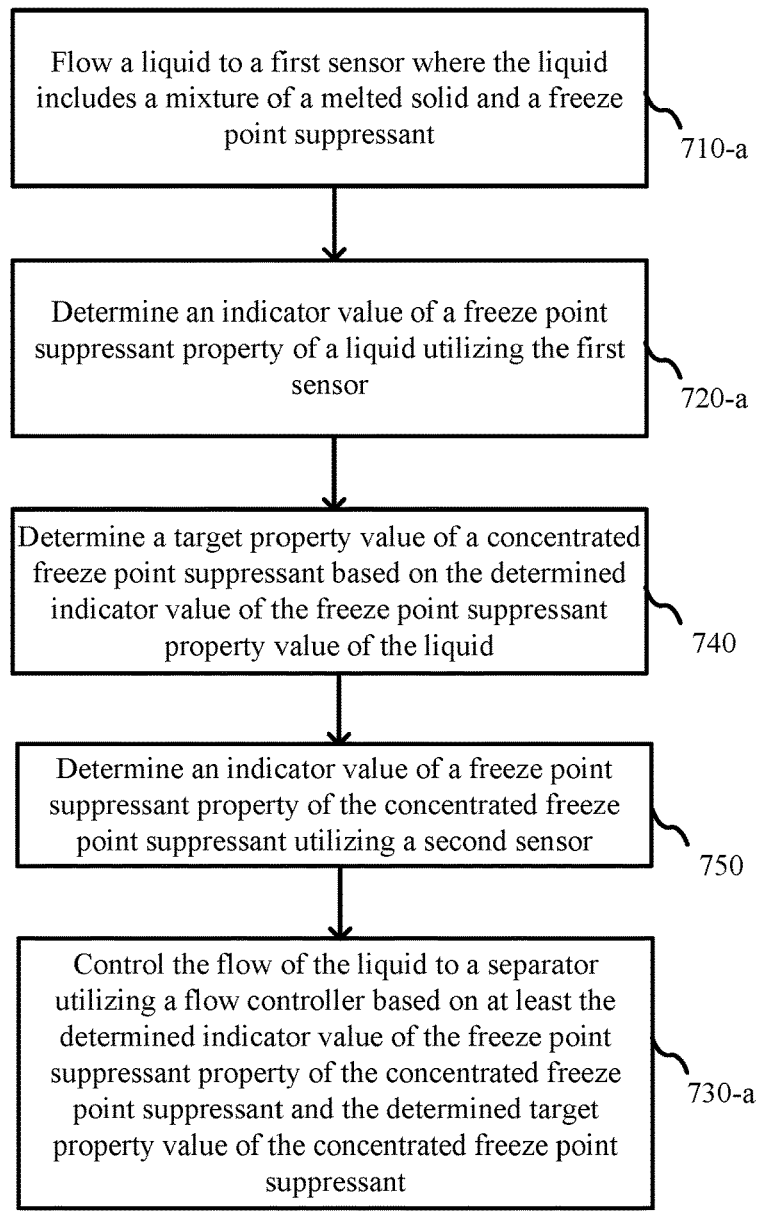
FIG. 7B shows a flow diagram of a method in accordance with various embodiments.

Turning now to FIG. 7B, a flow diagram of a method 700-a is shown in accordance with various embodiments. Method 700-a may be implemented utilizing a variety of systems, control logics, and/or devices such as those shown and/or described with respect to FIG. 1, FIG. 2A, FIG. 2B, FIG. 2C, FIG. 3A, FIG. 3B, FIG. 4A, FIG. 4B, FIG. 5A, FIG. 5B, FIG. 5C, FIG. 6A, FIG. 6B, FIG. 6C, and/or FIG. 6D. System 700-a may be an example of method 700 of FIG. 7A.

At block 710-a, a liquid may flow to a first sensor where the liquid includes a mixture of a melted solid and a freeze point suppressant. At block 720-a, an indicator value of a freeze point suppressant property of a liquid may be determined utilizing the first sensor. At block 740, a target property value of a concentrated freeze point suppressant may be determined based on the determined indicator value of the freeze point suppressant property of the liquid. At block 750, an indicator value of a freeze point suppressant property of the concentrated freeze point suppressant may be determined utilizing a second sensor. At block 730-a, the flow of the liquid to a separator may be controlled utilizing a flow controller based on at least the determined indicator value of the freeze point suppressant property of the concentrated freeze point suppressant and the determined target property value of the concentrated freeze point suppressant.

These embodiments may not capture the full extent of combination and permutations of materials and process equipment. However, they may demonstrate the range of applicability of the method, devices, and/or systems. The different embodiments may utilize more or fewer stages than those described.

It should be noted that the methods, systems, and devices discussed above are intended merely to be examples. It must be stressed that various embodiments may omit, substitute, and/or add various procedures or components as appropriate. For instance, it should be appreciated that, in alternative embodiments, the methods may be performed in an order different from that described, and that various stages may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the embodiments.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which may be depicted as a flow diagram or block diagram or as stages. Although each may describe the operations as a sequential process, many of the operations can be performed in parallel or concurrently. In addition, the order of the operations may be rearranged. A process may have additional stages not included in the figure.

Having described several embodiments, it will be recognized by those of skill in the art that various modifications, alternative constructions, and equivalents may be used without departing from the spirit of the different embodiments. For example, the above elements may merely be a component of a larger system, wherein other rules may take precedence over or otherwise modify the application of the different embodiments. Also, a number of stages may be undertaken before, during, or after the above elements are considered. Accordingly, the above description should not be taken as limiting the scope of the different embodiments.

What is claimed is:

1. A method of freeze point suppression cycle control comprising:
   pumping a liquid from a tank to a first sensor, wherein the liquid is formed in the tank through combining a freeze point suppressant and a solid that forms a melted solid;
   flowing the liquid to the first sensor, wherein the liquid includes a mixture of the melted solid and the freeze point suppressant;
   determining an indicator value of a freeze point suppressant property of the liquid utilizing the first sensor;
   controlling a flow of the liquid to a separator utilizing a flow controller based on at least the determined indicator value of the freeze point suppressant property of the liquid, wherein the separator forms a concentrated freeze point suppressant from the liquid;
   determining a target property value of the concentrated freeze point suppressant based on the determined indicator value of the freeze point suppressant property of the liquid;
   determining an indicator value of a freeze point suppressant property of the concentrated freeze point suppressant utilizing a second sensor; and
   controlling further the flow of the liquid to the separator utilizing the flow controller based on at least the determined indicator value of the freeze point suppressant property of the concentrated freeze point suppressant and the determined target property value of the concentrated freeze point suppressant.

2. The method of claim 1, wherein:
   determining the indicator value of the freeze point suppressant property of the liquid includes determining a temperature value of the liquid utilizing the first sensor; and
   determining the indicator value of the freeze point suppressant property of the concentrated freeze point suppressant includes determining a temperature value of the concentrated freeze point suppressant utilizing the second sensor.

3. The method of claim 1, wherein:
determining the indicator value of the freeze point suppressant property of the liquid includes determining a spectral signature of the liquid utilizing the first sensor; and
determining the indicator value of the freeze point suppressant property of the concentrated freeze point suppressant includes determining a refractive index of the concentrated freeze point suppressant utilizing the second sensor.

4. The method of claim 1, wherein:
determining the indicator value of the freeze point suppressant property of the liquid includes determining a temperature of the liquid utilizing the first sensor; and
determining the indicator value of the freeze point suppressant property of the concentrated freeze point suppressant includes determining a refractive index of the concentrated freeze point suppressant utilizing the second sensor.

5. The method of claim 1, wherein the indicator value of the freeze point suppressant property of the liquid includes at least a concentration value of the liquid, a density value of the liquid, a conductivity value of the liquid, a capacitance value of the liquid, a refractive index value of the liquid, a temperature value of the liquid, a pressure value of the liquid, a heat capacity value of the liquid, a freezing point value of the liquid, or a boiling point value of the liquid.

6. The method of claim 1, wherein the target property value of the concentrated freeze point suppressant includes least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant.

7. The method of claim 1, wherein the indicator value of the freeze point suppressant property of the concentrated freeze point suppressant includes at least a concentration value of the concentrated freeze point suppressant, a density value of the concentrated freeze point suppressant, a conductivity value of the concentrated freeze point suppressant, a capacitance value of the concentrated freeze point suppressant, a refractive index value of the concentrated freeze point suppressant, a temperature value of the concentrated freeze point suppressant, a pressure value of the concentrated freeze point suppressant, a heat capacity value of the concentrated freeze point suppressant, a freezing point value of the concentrated freeze point suppressant, or a boiling point value of the concentrated freeze point suppressant.

8. The method of claim 1, further comprising forming the concentrated freeze point suppressant from the liquid utilizing the separator.

9. The method of claim 8, further comprising combining the concentrated freeze point suppressant with a solid to form a portion of the liquid.

10. The method of claim 8, wherein the separator includes at least a mechanical separator or a thermal separator.

11. The method of claim 8, wherein forming the concentrated freeze point suppressant from the liquid utilizing the separator includes at least:
separating at least a portion of the freeze point suppressant from the liquid; or
separating at least a portion of the melted solid from the liquid.

12. The method of claim 8, wherein the separator includes a distillation vessel.

13. The method of claim 12, wherein the flow controller includes a variable-speed compressor that creates suction with respect to the distillation vessel.

14. The method of claim 13, further comprising flowing the concentrated freeze point suppressant through a control valve coupled with the controller and controls at least a flow of the concentrated freeze point suppressant from the distillation vessel or a flow of liquid from the distillation vessel to reform the melted solid.

15. A freeze point suppression cycle control system comprising:
a first sensor positioned to determine an indicator value of a freeze point suppressant property of a liquid, wherein the liquid includes a mixture of a melted solid and a freeze point suppressant;
a flow controller that controls a flow of the liquid to a separator;
a controller coupled with the first sensor and with the flow controller, wherein the controller controls the flow of the liquid to the separator utilizing the flow controller based on at least the determined indicator value of the freeze point suppressant property of the liquid and the controller utilizes the determined indicator value of the freeze point suppressant property of the liquid to determine a target property value of the concentrated freeze point suppressant;
the separator, wherein the separator forms a concentrated freeze point suppressant from the liquid;
a second sensor positioned to determine an indicator value of a freeze point suppressant property of the concentrated freeze point suppressant, wherein the second sensor is coupled with the controller and the controller further controls the flow of the liquid utilizing the flow controller to the separator based on at least the determined indicator value of the freeze point suppressant property of the concentrated freeze point suppressant and the determined target property value of the concentrated freeze point suppressant; and
a mixing tank that combines the concentrated freeze point suppressant with a solid to form a portion of the liquid.

16. The system of claim 15, wherein the first sensor includes a temperature sensor and the second sensor includes a temperature sensor.

17. The system of claim 15, wherein the first sensor includes a spectrometer and the second sensor includes a refractometer.

18. The system of claim 15, wherein the first sensor includes a temperature sensor and the second sensor includes a refractometer.

19. The system of claim 15, further comprising a pump that delivers the liquid to at least the first sensor or the flow controller.

20. The system of claim 15, wherein the separator includes at least a mechanical separator or a thermal separator.

21. The system of claim 15, wherein the separator forms the concentrated freeze point suppressant from the liquid through at least:

separating at least a portion of the freeze point suppressant from the liquid; or separating at least a portion of the melted solid from the liquid.

22. The system of claim 15, wherein the separator includes a distillation vessel.

23. The system of claim 22, wherein the flow controller includes a variable-speed compressor that creates suction with respect the distillation vessel.

24. The system of claim 23, wherein the flow controller further includes a control valve coupled with the controller and controls at least a flow of the concentrated freeze point suppressant from the distillation vessel or a flow of liquid from the distillation vessel to reform the melted solid.

* * * * *